(12) United States Patent
Hattori

(10) Patent No.: US 10,448,031 B2
(45) Date of Patent: Oct. 15, 2019

(54) METHOD OF GENERATING MEDIA FILE AND STORAGE MEDIUM STORING MEDIA FILE GENERATION PROGRAM

(71) Applicant: CANON KABUSHIKI KAISHA, Tokyo (JP)

(72) Inventor: Hideaki Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/178,377

(22) Filed: Nov. 1, 2018

(65) Prior Publication Data

US 2019/0075307 A1   Mar. 7, 2019

Related U.S. Application Data

(63) Continuation of application No. 15/622,950, filed on Jun. 14, 2017, which is a continuation of application No. 14/412,193, filed as application No. PCT/JP2013/004049 on Jun. 28, 2013, now Pat. No. 9,723,317.

(30) Foreign Application Priority Data

Jul. 2, 2012  (JP) .................................. 2012-148511

(51) Int. Cl.
| | |
|---|---|
| H04N 21/4728 | (2011.01) |
| H04N 19/70 | (2014.01) |
| H04N 19/169 | (2014.01) |
| H04N 21/845 | (2011.01) |
| H04N 21/854 | (2011.01) |
| H04N 19/46 | (2014.01) |
| H04N 19/167 | (2014.01) |
| H04N 19/174 | (2014.01) |

(52) U.S. Cl.
CPC ......... *H04N 19/188* (2014.11); *H04N 19/167* (2014.11); *H04N 19/174* (2014.11); *H04N 19/46* (2014.11); *H04N 19/70* (2014.11); *H04N 21/4728* (2013.01); *H04N 21/8455* (2013.01); *H04N 21/85406* (2013.01)

(58) Field of Classification Search
CPC .. H04N 19/188; H04N 19/167; H04N 19/174; H04N 19/46; H04N 19/70; H04N 21/4728
USPC ..................................................... 375/240.02
See application file for complete search history.

(56) References Cited

U.S. PATENT DOCUMENTS

| | | | | |
|---|---|---|---|---|
| 2010/0232504 A1* | 9/2010 | Feng | .................... | H04N 19/176 375/240.13 |
| 2010/0325303 A1* | 12/2010 | Wang | .................... | G06Q 30/06 709/231 |

(Continued)

*Primary Examiner* — William C Vaughn, Jr.
*Assistant Examiner* — Jae N Noh
(74) *Attorney, Agent, or Firm* — Canon U.S.A., Inc. IP Division

(57) ABSTRACT

A method of generating a media file using a media file format in which a set of pictures including one or more pictures is coded and stored such that each picture is divided, in coding order, into two or more slices, and coded data of each slice is stored as NAL unit data, the method comprising: dividing each slice into two or more rectangular-shaped tiles and coding the two or more rectangular-shaped tiles; and providing a slice index box in the media file format such that a value indicating an ordinal position of each slice to which each tile belongs in each picture is described in the slice index box.

18 Claims, 34 Drawing Sheets

(56) References Cited

U.S. PATENT DOCUMENTS

| | | | |
|---|---|---|---|
| 2012/0230399 A1* | 9/2012 | Segall | H04N 19/176 375/240.08 |
| 2013/0097334 A1* | 4/2013 | Wu | H04L 65/608 709/231 |
| 2014/0003531 A1* | 1/2014 | Coban | H04N 19/70 375/240.24 |

* cited by examiner

FIG. 3A

| BOX SIZE |
|---|
| BOX IDENTIFIER |
| NUMBER OF ENTRIES |
| SLICE INDEX OF TILE #2 |
| SLICE INDEX OF TILE #3 |
| SLICE INDEX OF TILE #4 |
| ⋮ |
| SLICE INDEX OF TILE #(N−1) |
| SLICE INDEX OF TILE #N |

FIG. 3B

| |
|---|
| 40 |
| "sidx" |
| 15 |
| 0 |
| 0 |
| 0 |
| 1 |
| 1 |
| 1 |
| 1 |
| 2 |
| 2 |
| 2 |
| 2 |
| 3 |
| 3 |
| 3 |
| 3 |

FIG. 9A

| BOX SIZE |
|---|
| BOX IDENTIFIER |
| NUMBER OF ENTRIES |
| INDEX OF TILE AT BEGINNING OF SLICE #2 |
| ⋮ |
| INDEX OF TILE AT BEGINNING OF SLICE #M |

FIG. 9B

| 16 |
|---|
| "tidx" |
| 3 |
| 4 |
| 8 |
| 12 |

FIG. 11A

| BOX SIZE |
|---|
| BOX IDENTIFIER |
| NUMBER OF ENTRIES |
| NUMBER OF TILE OFFSET BYTES OF TILE #2 |
| NUMBER OF TILE OFFSET BYTES OF TILE #3 |
| NUMBER OF TILE OFFSET BYTES OF TILE #4 |
| ⋮ |
| NUMBER OF TILE OFFSET BYTES OF TILE #(N−1) |
| NUMBER OF TILE OFFSET BYTES OF TILE #N |

FIG. 11B

| 72 |
|---|
| "tsob" |
| 15 |
| 8276 |
| 18230 |
| 24560 |
| 32520 |
| 37945 |
| 42345 |
| 49072 |
| 57824 |
| 61060 |
| 65034 |
| 68926 |
| 72500 |
| 76340 |
| 82475 |
| 86450 |

FIG. 14A

| BOX SIZE |
|---|
| BOX IDENTIFIER |
| NUMBER OF ENTRIES |
| NUMBER OF SLICES IN TILE #1 |
| NUMBER OF SLICES IN TILE #2 |
| NUMBER OF SLICES IN TILE #3 |
| ⋮ |
| NUMBER OF SLICES IN TILE #(N−1) |
| NUMBER OF SLICES IN TILE #N |

FIG. 14B

| 18 |
|---|
| "nmsi" |
| 4 |
| 4 |
| 4 |
| 2 |
| 2 |

FIG. 19A

| |
|---|
| BOX SIZE |
| BOX IDENTIFIER |
| NUMBER OF ENTRIES |
| NUMBER OF TILE OFFSET BYTES OF TILE #2 |
| NUMBER OF TILE OFFSET BYTES OF TILE #3 |
| ⋮ |
| NUMBER OF TILE OFFSET BYTES OF TILE #(N−1) |
| NUMBER OF TILE OFFSET BYTES OF TILE #N |

FIG. 19B

| |
|---|
| 22 |
| "stob" |
| 3 |
| 32520 |
| 57824 |
| 72500 |

FIG. 23A

| BOX SIZE |
| --- |
| BOX IDENTIFIER |
| TILE SET ID |
| NUMBER OF ENTRIES |
| MCTS SLICE INDEX |
| ⋮ |
| MCTS SLICE INDEX |

FIG. 23B

| 18 |
| --- |
| "mtsi" |
| 8 |
| 2 |
| 2 |
| 3 |

FIG. 25

| |
|---|
| 26 |
| "mtsi" |
| 0 |
| 6 |
| 0 |
| 1 |
| 2 |
| 3 |
| 8 |
| 9 |

FIG. 27A

| BOX SIZE |
|---|
| BOX IDENTIFIER |
| NUMBER OF ENTRIES |
| MCTS TILE SET ID OF ROI |
| PRIORITY OF ROI |
| ⋮ |
| MCTS TILE SET ID OF ROI |
| PRIORITY OF ROI |

FIG. 27B

| 20 |
|---|
| "rits" |
| 2 |
| 0 |
| 0 |
| 8 |
| 255 |

FIG. 29A

| BOX SIZE |
| --- |
| BOX IDENTIFIER |
| ROI ID |
| PRIORITY OF ROI |
| NUMBER OF ENTRIES |
| ROI TILE INDEX |
| ⋮ |
| ROI TILE INDEX |

FIG. 29B

| 23 |
| --- |
| "riti" |
| 1 |
| 255 |
| 4 |
| 5 |
| 6 |
| 9 |
| 10 |

FIG. 32A

| BOX SIZE |
|---|
| BOX IDENTIFIER |
| TILE SET ID |
| NUMBER OF ENTRIES |
| START VALID SAMPLE |
| NUMBER OF CONTINUOUS VALID SAMPLES |
| ⋮ |
| START VALID SAMPLE |
| NUMBER OF CONTINUOUS VALID SAMPLES |

FIG. 32B

| 22 |
|---|
| "rivs" |
| 0 |
| 1 |
| 22 |
| 16 |

FIG. 32C

| 30 |
|---|
| "rivs" |
| 8 |
| 2 |
| 0 |
| 14 |
| 30 |
| 8 |

METHOD OF GENERATING MEDIA FILE AND STORAGE MEDIUM STORING MEDIA FILE GENERATION PROGRAM

CROSS-REFERENCE TO RELATED APPLICATIONS

This application is a continuation, and claims the benefit, of U.S. patent application Ser. No. 15/622,950 filed Jun. 14, 2017, which is a continuation, and claims the benefit, of U.S. patent application Ser. No. 14/412,193 filed Dec. 30, 2014, now U.S. Pat. No. 9,723,317, issued Aug. 1, 2017, which is a National Stage Application of International Application No. PCT/JP2013/004049 filed Jun. 28, 2013, which claims the benefit of Japanese Patent Application No. 2012-148511 filed Jul. 2, 2012. All of the above applications are hereby incorporated by reference herein in their entirety.

TECHNICAL FIELD

The present invention relates to a method of generating a media file and a storage medium storing a media file generation program, and more particularly, to a technique of formatting a media file such that each picture is divided into rectangular-shaped tiles and coded.

BACKGROUND ART

A great advance has been made in digital technology. As a result, it has become very popular to take a high-resolution motion picture using a digital camera or a digital video camera. To store a digital motion picture in an efficient manner in a storage medium typified by a flash memory, the data is generally compressed (coded). H.264/MPEG-4 AVC (hereinafter referred to as H.264) is a technique widely used to code motion pictures.

A Joint Collaborative Team on Video Coding (JCT-VC) has been established by the ISO/IEC and the ITU-T to develop a further high efficiency coding standard as a successor to the H.264 coding standard. More specifically, a High Efficiency Video Coding (hereinafter referred to as HEVC) standard is under development in the JCT-VC.

In the standardization of HEVC, various coding tools are under discussion, in terms of not only an improvement in coding efficiency but also other factors including implementability, processing time, and the like. Issues under discussion include parallel processing of coding/decoding, a technique of dividing a picture into slices along a horizontal direction to increase error resilience, a technique of dividing a picture into rectangular areas called tiles, and other techniques (NPL 1). Use of slices or tiles makes it possible to perform coding and decoding in parallel, which allows an increase in processing speed. Use of slices or tiles also allows a reduction in memory capacity necessary in the coding/decoding process. HEVC allows it use a mixture of dividing into slices and dividing into tiles.

A technique called a motion constrained tile sets (MCTS) technique is used to code a video sequence using the division into tiles such that it is allowed to decode only a particular tile independently of the other tiles from a coded stream of successive pictures (NPL 4). When a coded stream includes an MCTS SEI message, a video sequence is supposed to be coded so as to satisfy the following conditions.

All pictures in the video sequence are coded such that the division into tiles is performed in the same manner.
In MCTS coding, coding is performed without using a motion vector that refers to a pixel outside the tile set.

In decoding of a coded stream, when the coded stream includes an MCTS SEI message, it is allowed to extract only a tile set specified as MCTS from a sequence of pictures and quickly decode or play back the extracted MCTS tile set as a partial motion picture. Use of MCTS make it possible to quickly decode only a region a user is interested in. Hereinafter, such a region of interest will also be referred as a ROI.

An AVC (Advanced Video Coding) file format (NPL 2) is widely used as a media file format to store H.264 video data. It is expected that HEVC will provide a media file format similar to the AVC file format.

When a low-resolution device is used to play back a movie including a sequence of one or more high-resolution pictures each including, for example, 4096 pixels in a horizontal direction and 2048 pixels in a vertical direction (hereinafter referred to as 4096×2048 pixels), it may be advantageous to extract a particular area and play back only the extracted area. This may apply, for example, to a use case in which a face of a particular person is extracted from a scene including many people and the extracted face is displayed in an enlarged manner. In such a use case, if a whole picture area of a picture in a movie is first decoded and a partial area is extracted and displayed, a long decoding time (a delay time before the picture is displayed) and large power consumption are necessary. Thus, when a partial area is extracted and the extracted area is played back, the capability of dividing each picture into tiles and coding the resultant tiles, and, in a playback operation, decoding only particular tiles provides advantages in particular in terms of a reduction in delay time before the picture is displayed and a reduction in power consumption.

In the AVC file format described in NPL 2, coded data of each picture (denoted as sample data in NPL 2) is stored in units of coded data of slices. The coded data of each slice is added with one-byte data called a NAL header thereby being converted into NAL unit data. NAL stands for Network Abstraction Layer, and a detailed description thereof may be found, for example, in Section 7.4.1 of NPL 1, and thus a further description thereof here is omitted. In front of each NAL unit data, data indicating a NAL unit data length is put to indicate the data length, in bytes, of the NAL unit data. Thus, in a process of playing back the media file written in the AVC file format, it is allowed to access coded data of an arbitrary slice in a picture without coding the slice.

In a case where coding is performed according to HEVC using a mode in which one slice is divided into a plurality of tiles, coding parameters necessary in decoding each tile are described in a slice header to which the tile belongs. Therefore, even in a case where only part of tiles in a slice are decoded, it is necessary to decode the slice header of this slice.

In HEVC, it is possible to calculate the number of pixels in the horizontal direction and that in the vertical direction of a tile from coding parameters in a picture parameter set (PPS) described in Section 7.4.2.3 of NPL 1. More specifically, for example, it is possible to calculate the numbers of pixels in the horizontal and vertical directions for each tile from a parameter (num_tile_columns_minus1) indicating the number of tile columns minus 1, a parameter (num_tile_rows_minus1) indicating the number of tile rows minus 1, and the numbers of horizontal and vertical pixels in a sequence parameter set (SPS) described in NPL 1.

However, the numbers of pixels in the horizontal and vertical directions of each slice are not described in SPS or PPS, and thus acquisition of the numbers of pixels in the horizontal and vertical directions of each slice is possible only by decoding the slice of interest.

That is, when a particular tile in a picture is extracted and decoded, it is not possible to know the ordinal position of a slice in which the tile of interest to be decoded is included without decoding slices. Therefore, it is necessary to decode the whole picture area, which results in a long decoding time and large power consumption.

HEVC also allows a coding mode in which each picture is divided into tiles and slices such that a plurality of slices are included in one tile. However, as in the previous case, noway is provided to know which slice is to be decoded to get a correct tile to be decoded, without decoding slices. Therefore, it is necessary to code the whole picture area, which results in a long decoding time and large power consumption.

In view of the above, the present invention provides a technique of extracting a particular tile in a picture and decoding the extracted tile at an improved processing speed, with reduced power consumption, and with a reduced memory capacity.

CITATION LIST

Non Patent Literature

[NPL 1]
JCT-VC document, JCTVC-11003-d4.doc available at Internet site, http://phenix.int-evry.fr/jct/doc_end_user/documents/9_Geneva/wg11/
[NPL2]
ISO/IEC 14496-15 Advanced Video Coding (AVC) file format
[NPL 3]
ISO/IEC 14496-12 ISO base media file format
[NPL 4]
JCT-VC document, JCTVC-M0235-v3.doc available at Internet site, http://phenix.int-evry.fr/jct/doc_end_user/documents/13_Inc heon/wg11/

SUMMARY OF INVENTION

In an embodiment, the invention provides a method of generating a media file using a media file format in which a set of pictures including one or more pictures is coded and stored such that each picture is divided, in coding order, into two or more slices, and coded data of each slice is stored as NAL unit data, the method including dividing each slice into two or more rectangular-shaped tiles and coding the two or more rectangular-shaped tiles, and providing a slice index box in the media file format such that a value indicating an ordinal position of each slice to which each tile belongs in each picture is described in the slice index box.

In an embodiment, the invention provides a method of generating a media file using a media file format in which a set of pictures including one or more pictures is coded and stored such that each picture is divided, in coding order, into two or more slices, and coded data of each slice is stored as NAL unit data, the method including dividing each slice into two or more rectangular-shaped tiles and coding the two or more rectangular-shaped tiles, and providing a tile index box in the media file format such that a value indicating an ordinal position of a tile at the beginning of each slice in each picture is described in the tile index box.

In an embodiment, the invention provides a method of generating a media file using a media file format in which a set of pictures including one or more pictures is coded and stored such that each picture is divided, in coding order, into two or more slices, and coded data of each slice is stored as NAL unit data, the method including dividing each slice into two or more rectangular-shaped tiles and coding the two or more rectangular-shaped tiles, and providing a tile offset box in the media file format such that the number of bytes indicating an offset from the beginning of coded data of each picture to coded data of each tile is described in the tile offset box.

The media file format according to one of embodiments of the invention allows it to access coded data of any tile without decoding coded data of a slice that does not include any tile to be decoded. Thus, when only particular tiles are decoded and displayed or played back, a reduction in decoding time and reduction in power consumption are achieved. Furthermore, a memory capacity necessary is smaller than is necessary to decode the whole picture area.

BRIEF DESCRIPTION OF DRAWINGS

FIG. 3A is a diagram illustrating a format of a slice index box according to an embodiment.

FIG. 3B is a diagram illustrating an example of a content of a slice index box according to an embodiment.

FIG. 9A is a diagram illustrating an example of a format of a tile index box according to an embodiment.

FIG. 9B is a diagram illustrating an example of a content of a tile index box according to an embodiment.

FIG. 11A is a diagram illustrating an example of a format of a tile offset box according to an embodiment.

FIG. 11B is a diagram illustrating an example of a content of a tile offset box according to an embodiment.

FIG. 14A is a diagram illustrating an example of a format of a number-of-slices-in-tile box according to an embodiment.

FIG. 14B is a diagram illustrating an example of a content of a number-of-slices-in-tile box according to an embodiment.

FIG. 19A is a diagram illustrating an example of a format of a tile offset box according to an embodiment.

FIG. 19B is a diagram illustrating an example of a content of a tile offset box according to an embodiment.

FIG. 23A is a diagram illustrating a format of an MCTS slice index box according to an embodiment.

FIG. 23B is a diagram illustrating an example of a content of an MCTS slice index box according to an embodiment.

FIG. 25 is a diagram illustrating an example of a content of an MCTS slice index box according to an embodiment.

FIG. 27A is a diagram illustrating a format of a ROI tile set box according to an embodiment.

FIG. 27B is a diagram illustrating an example of a content of a ROI tile set box according to an embodiment.

FIG. 29A is a diagram illustrating a format of a ROI tile index box according to an embodiment.

FIG. 29B is a diagram illustrating an example of a content of a ROI tile index box according to an embodiment.

FIG. 32A is a diagram illustrating a format of a ROI valid sample box according to an embodiment.

FIG. 32B is a diagram illustrating an example of a content of a ROI valid sample box according to an embodiment.

FIG. 32C is a diagram illustrating an example of a content of a ROI valid sample box according to an embodiment.

DESCRIPTION OF EMBODIMENTS

The invention is described in further detail below with reference to embodiments in conjunction with accompanying drawings. Note that embodiments are described below only by way of example but not limitation.

First Embodiment

Figure 1:
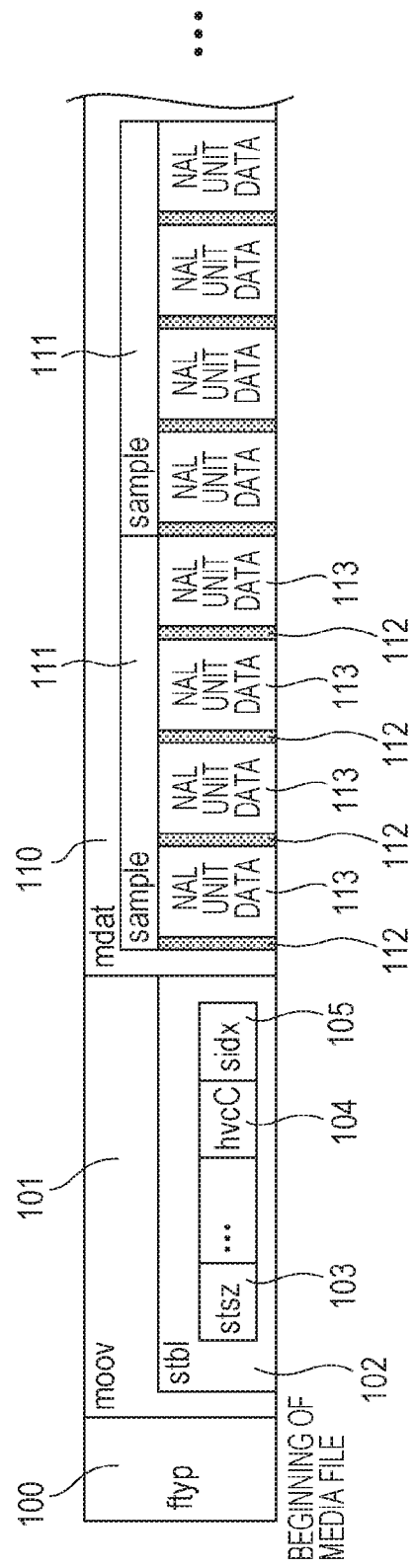
FIG. 1 is a diagram illustrating a media file format according to an embodiment.

FIG. 1 illustrates a format of a media file in which coded data is stored according to a first embodiment. The format according to the present embodiment may be applied to a case where a picture is divided into slices and tiles such that a plurality of rectangular-shaped tiles are included in one slice.

As illustrated in FIG. 1, in the media file format according to the present embodiment, as with the AVC file format, the format includes a file type box 100, a movie box 101, and a media data box 110. The box is a data type in which data is stored together with an identifier indicating a type of data and a data size. For further information about the box, see Section 6.2 of NPL 3.

The file type box (denoted as ftyp in FIG. 1) 100 describes information indicating a format employed by a media file. In a case where the media file is according to a HEVC coding format, hvc1, hev1, hvcC, or a similar character string is described as an identifier in the file type box 100.

The media data box 110 is a box in which a main part of media data such as coded picture data or coded audio data is stored. As described in Section 5.3.4.2 of NPL 2, a set of coded data of pictures is stored in the media data box 110 such that the set of coded data is divided into units of sample data 111 each corresponding to one picture. Each sample data 111 includes a plurality of pieces of NAL unit data each including, as described above, coded data of one slice and data indicating the data length of the NAL unit.

The movie box (in FIG. 1, denoted as moov) 101 is a box storing information for use in decoding or displaying the data stored in the media data box 110. The movie box 101 may include a sample table box (in FIG. 1, denoted as stbl) 102. In general, there are a plurality of boxes in a hierarchical manner between the movie box 101 and the sample table box 102. However, a further description of these boxes existing between the movie box 101 and the sample table box 102 is omitted, because they do not have direct relevance to the present embodiment. For information about these boxes, see Section 6.2.3 of NPL 3.

The sample table box 102 includes a sample size box 103, a HEVC configuration box 104, and a slice index box 105. In general, the sample table box 102 includes further many boxes having no direct relation to the present embodiment, and thus they are not illustrated in FIG. 1, and no further description thereof is given here. The sample size box (in FIG. 1, denoted as stsz) 103 describes the data length of each of all pieces of sample data 111 of the movie stored in the media data box 110. The HEVC configuration box (in FIG. 1, denoted as hvcC) 104 includes header information corresponding to SPS and PPS for use in decoding each piece of sample data 111 in the media data box 110. The slice index box (denoted as sidx in FIG. 1) 105 will be described later.

Use of the file format described above makes it possible to perform high-speed access to each piece of sample data 111 using sample size box 103 or the like, and thus it becomes possible to easily realize a special playback mode such as a fast forward playback mode, a reverse playback mode, or the like.

Note that the order of putting the file type box 100, the movie box 101, and the media data box 110 is not limited to that illustrated in FIG. 1. For example, those boxes may be stored in the media file in the order the file type box 100, the media data box 110, and the movie box 101.

Figure 2:
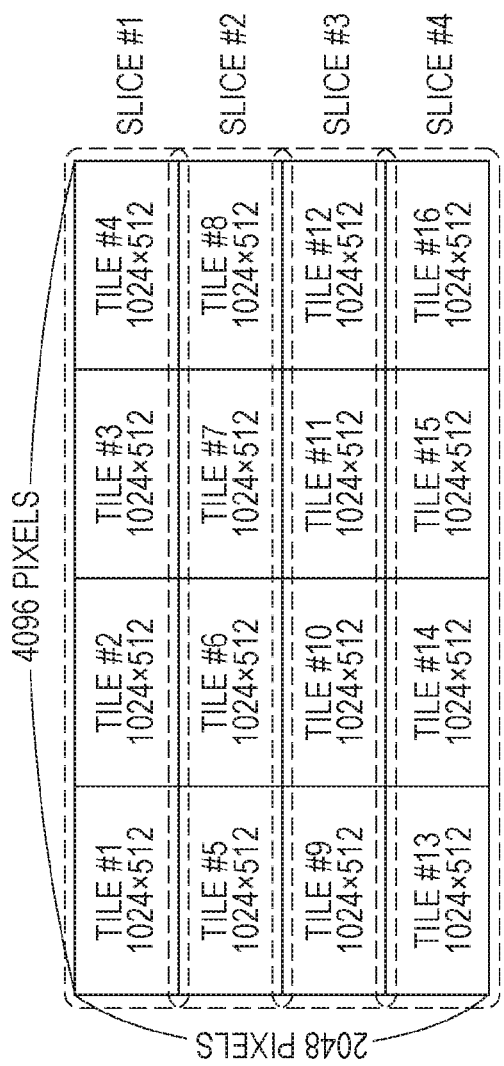
FIG. 2 is a diagram illustrating an example of a manner of dividing a picture into slices and tiles according to an embodiment.

FIG. 2 illustrates an example of a manner of dividing a picture of a movie into slices and tiles according to the present embodiment. As illustrated in FIG. 2, each picture including 4096×2048 pixels is divided into four slices each including 4096×512 pixels. In coding, when coding is complete for all pixels in each slice, an end-of-slice flag is coded to 1 to indicate that the end of the slice is reached. This end-of-slice flag corresponds to end of slice flag in HEVC described in Section 7.4.4 of NPL 1.

In decoding, if a decoded end-of-slice flag equal to 1 is detected, then this means that a slice boundary is detected in decoding in a media playback process.

In FIG. 2, each slice is internally divided into four tiles each including 1024×512 pixels. In HEVC, each tile size may be set in the coding process as illustrated in FIG. 2 by setting coding parameters in PPS, for example, as described below. Note that in the following description, it is assumed by way of example that coding in HEVC is performed in units called coding tree blocks each including 64×64 pixels.

A parameter tiles_or_entropy_coding_sync_idc is a coding parameter used to indicate whether a picture is divided into tiles and whether a plurality of coding tree block rows are to be processed in parallel. When this parameter is set to 1, that is, tiles_or_entropy_coding_sync_idc=1, this means that the picture is divided into tiles.

A parameter num_tile_columns_minus1 is a coding parameter used to indicate a manner of dividing a picture into columns of tiles. More specifically, num_tile_columns_minus1 is set to be equal to the number of tile columns of the picture minus 1. For example, when this parameter is set to 3 (num_tile_columns_minus1=3), then this means that the picture is divided into 4 tile columns.

A parameter num_tile_rows_minus1 is a coding parameter used to indicate a manner of dividing a picture into rows of tiles. More specifically, num_tile_rows_minus1 is set to be equal to the number of tile rows of the picture minus 1. For example, when this parameter is set to 3 (num_tile_rows_minus1=3), then this means that the picture is divided into 4 tile rows.

A parameter uniform_spacing_idc is a coding parameter used to indicate whether the numbers of pixels in horizontal and vertical directions in each tile in the picture are given explicitly. When this coding parameter is set to 0, then this means that the picture is equally divided into tiles depending on the horizontal and vertical numbers of divisions specified by num_tile_columns_minus1 and num_tile_rows_minus1. On the other hand, when this coding parameter is set to 1, the number of pixels in the horizontal direction in each tile is specified by column_width [i] and the number of pixels in the vertical direction in each tile is specified by row_height [i]. Note that even when this coding parameter is set to 1, the picture may be equally divided into tiles.

A parameter column_width [i] is a coding parameter used to indicate the number of pixels in the horizontal direction in each tile based on the number of pixels in the horizontal direction in each coding tree block. For example, the parameter may be set as column_width [i]=16 (i=0, 1, 2, 3).

A parameter row_height [i] is a coding parameter used to indicate the number of pixels in the vertical direction in each tile based on the number of pixels in the vertical direction in each coding tree block. For example, the parameter may be set as row_height [i]=8 (i=0, 1, 2, 3). Further parameters are available. For example, if a parameter is set such as uniform_spacing_idc=1, then this specifies that the tile division in FIG. 2 is performed such that the picture is equally divided into tiles. In the decoding, it is possible to know the size of each tile by analyzing the coding parameters included in PPS.

In the present embodiment, the slice index box 105 illustrated in FIG. 1 is used to indicate the correspondence between tiles and slices, and more particularly, indicate an ordinal number expressing the position of coded data of a slice (NAL unit data) to which coded data of a tile of interest belongs.

FIG. 3A illustrates an internal format of the slice index box 105. In a box size put at the beginning of the slice index box 105, 4-byte data is stored to indicate the total data length of the slice index box 105. In the present embodiment, the total data length of the slice index box 105 is given by 4 bytes+4 bytes+2 bytes+the number of entries=2 bytes.

Following the box size, a 4-byte identifier is inserted to indicate a box type. In the present embodiment, a character string "sidx" (Slice Index) is used as the identifier indicating the slice index box 105.

Following the box type, 2-byte data is inserted to indicate the number of entries, that is, the number of data bodies. In the slice index box 105 according to the present embodiment, the number of entries is equal to the number of tiles in a picture minus 1. Following the number of entries, as many 2-byte slice indexes of respective tiles which are main parts of data of the slice index box 105 are put as there are entries.

The slice index an ordinal number expressing the position of a slice to which a tile of interest in a picture belongs. Use of the slice index makes it possible to quickly access coded data of a particular tile. The slice indexes are stored in the same order as the order in which tiles are coded (upper left→upper right→lower left→lower right).

It is self-evident that a tile (tile #1) at a first position in the coding order is included in a slice (slice #1) at a first position in the coding order in the picture, and thus no slice index is inserted. For second and following tiles, if a tile of interest is included in a slice #2, a slice index thereof is set to 1. If a tile of interest is included in a slice #3, a slice index thereof is set to 2. When the number of slices included in the picture is N, the slice index takes one of value in a range from 0 to (N−1).

Figure 3B:
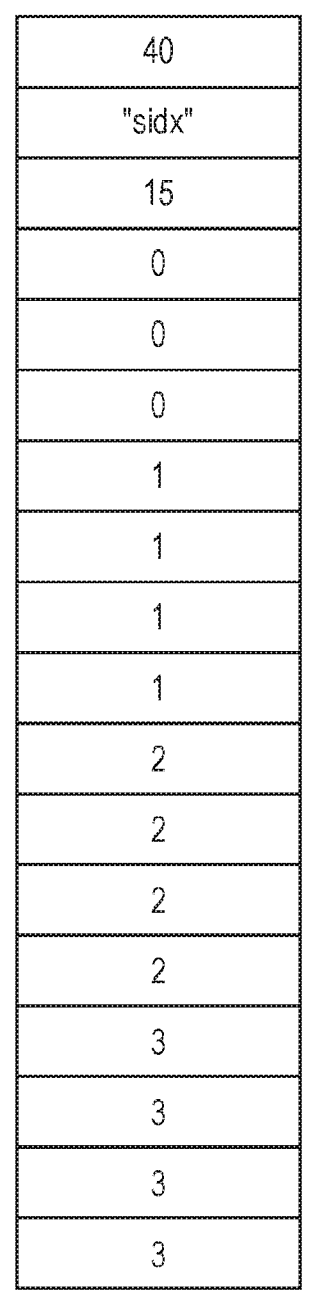

FIG. 3B illustrates an example of a content of a slice index box 105 in a case where a picture is divided into tiles and tiles as illustrated in FIG. 2. In the example illustrated in FIG. 2, the number of tiles is 16, the number of entries is 15 and the data size is given by 4+4+2+2×15=40 bytes.

Following the number of entries, slice indexes of the tile #2 to the tile #16 are inserted. As illustrated in FIG. 2, the tiles #2 to #4 are included in the slice #1, and thus 0 is stored as slice indexes of the tiles #2 to #4. On the other hand, the tiles #13 to #16 are included in the slice #4, and thus 3 is stored as corresponding slice indexes.

Basically, the slice index box 105 is stored in the sample table box 102. Note that the slice index box 105 may be stored in another box. For example, the slice index box 105 may be stored in any box in the movie box 101.

Referring to flow charts illustrated in FIG. 4 and FIG. 5, a description is given below as to a process of generating a media file in the form illustrated in FIG. 1 according to the present embodiment for a case in which coding is performed such that a picture is divided into a plurality of slices each including a plurality of tiles as in the example illustrated in FIG. 2.

Figure 4:
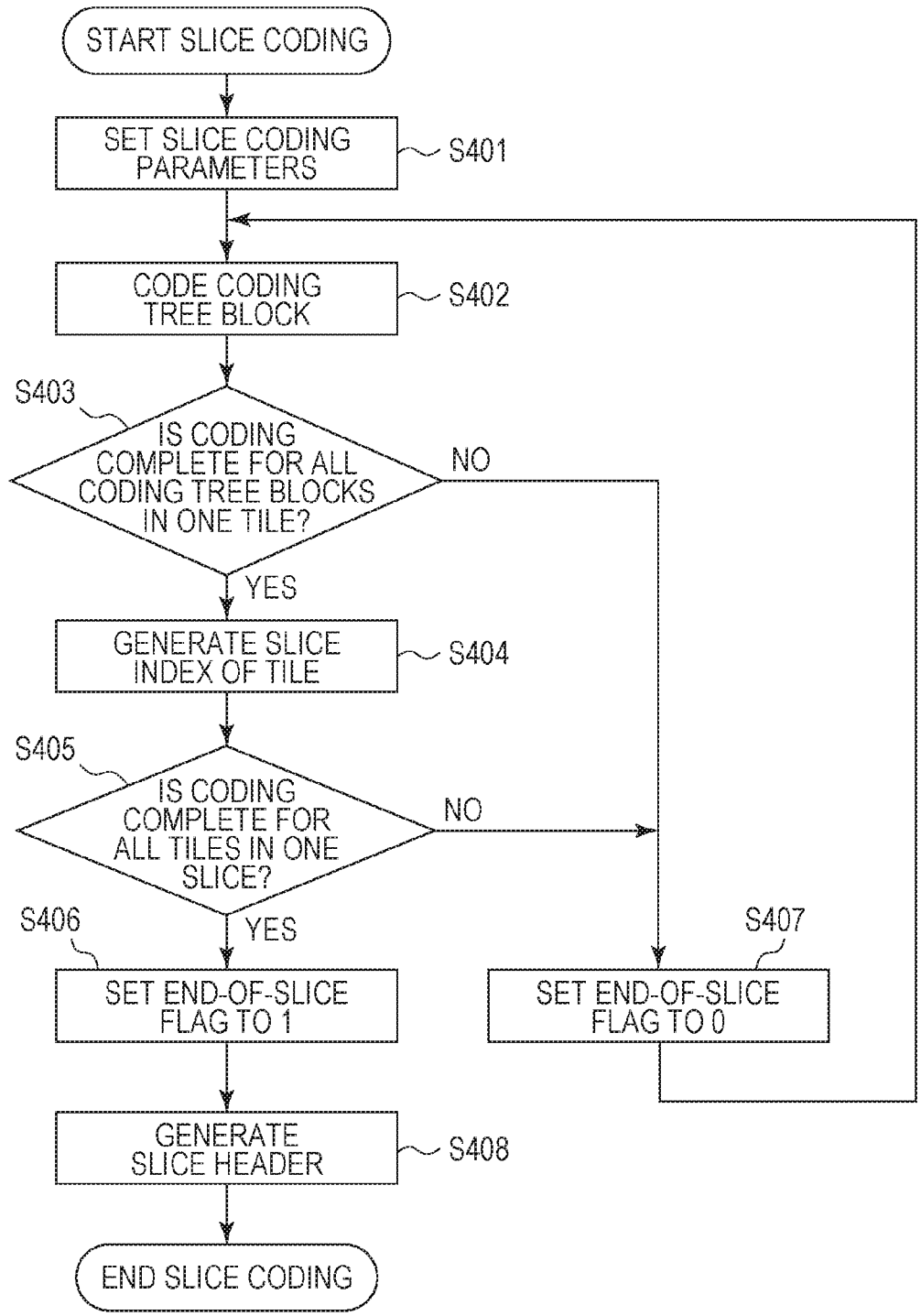
FIG. 4 is a flow chart of a process of coding a slice according to an embodiment.

FIG. 4 is a flow chart illustrating a process of coding each slice in a picture. In step S401, coding parameters used in coding the slices are externally set (by a user). Note that parameters associated with the slice dividing and the tile dividing are given in step S502 described below with reference to FIG. 5, and the coding parameters given in this step S401 are not relevant to the slice dividing and the tile dividing.

In step S402, a coding process is performed on the coding tree block in the slice. In HEVC, the coding tree block is a pixel block whose size is variable within a range of 16×16 pixels to 64×64 pixels. The order of coding the coding tree blocks depends on how the picture is divided into slices and tiles, although a further description thereof is omitted. Further information thereof may be found, for example, in Section 6.5.1 of NPL 1.

In the present embodiment, coding of the coding tree blocks does not depend on a particular coding algorithm, but any known coding algorithm may be used, and thus a description thereof is omitted. In step S403, when coding is completed for each coding tree block, a determination is performed as to whether coding is complete for one tile. If the coding is complete for one tile, the processing flow proceeds to step S404, but otherwise the processing flow proceeds to step S407.

In step S404, in response to the completion of the coding of one tile, a slice index is generated, which is to be stored in a slice index box 105 which is to be created. In the present embodiment, the slice index is calculated based on the information indicating the ordinal number expressing the position of the slice to which the coded tile belongs to. In this step S404, also a calculation is performed to determine the coded data length in bytes of the coded data obtained as a result of the coding of the tile.

In step S405, a determination is performed as to whether coding is complete for one slice. When the coding is complete for one slice, the processing flow proceeds to step S406, but otherwise the processing flow proceeds to step S407. In step S406, the end-of-slice flag is coded to 1 to indicate that the coding is complete for the one slice, and the processing flow proceeds to step S408. In the case where the processing flow proceeds to step S407, in response to the determination that the coding is not complete for the slice, the end-of-slice flag is coded to 0, and then the processing flow returns to step S402 to code a following coding tree block.

In step S408, a coding parameter entry_point_offset, which is included in a slice header in HEVC, is calculated from the coded data lengths of the tiles calculated in step S404. As described in NPL 1, first entry_point_offset indicates an offset from the end of a slice header to the beginning of coded data of a second tile. Similarly, second entry_point_offset indicates an offset from the beginning of the coded data of the second tile to the beginning of the coded data of the third tile. In this way, it is possible to access coded data of any tile based on the entry_point_offset. In step S408, a slice header is generated and coded from the entry_point_offset and the coding parameters set in step S401 and used in the coding of the slice, and thus the generation of coded data of one slice is completed.

Figure 5:
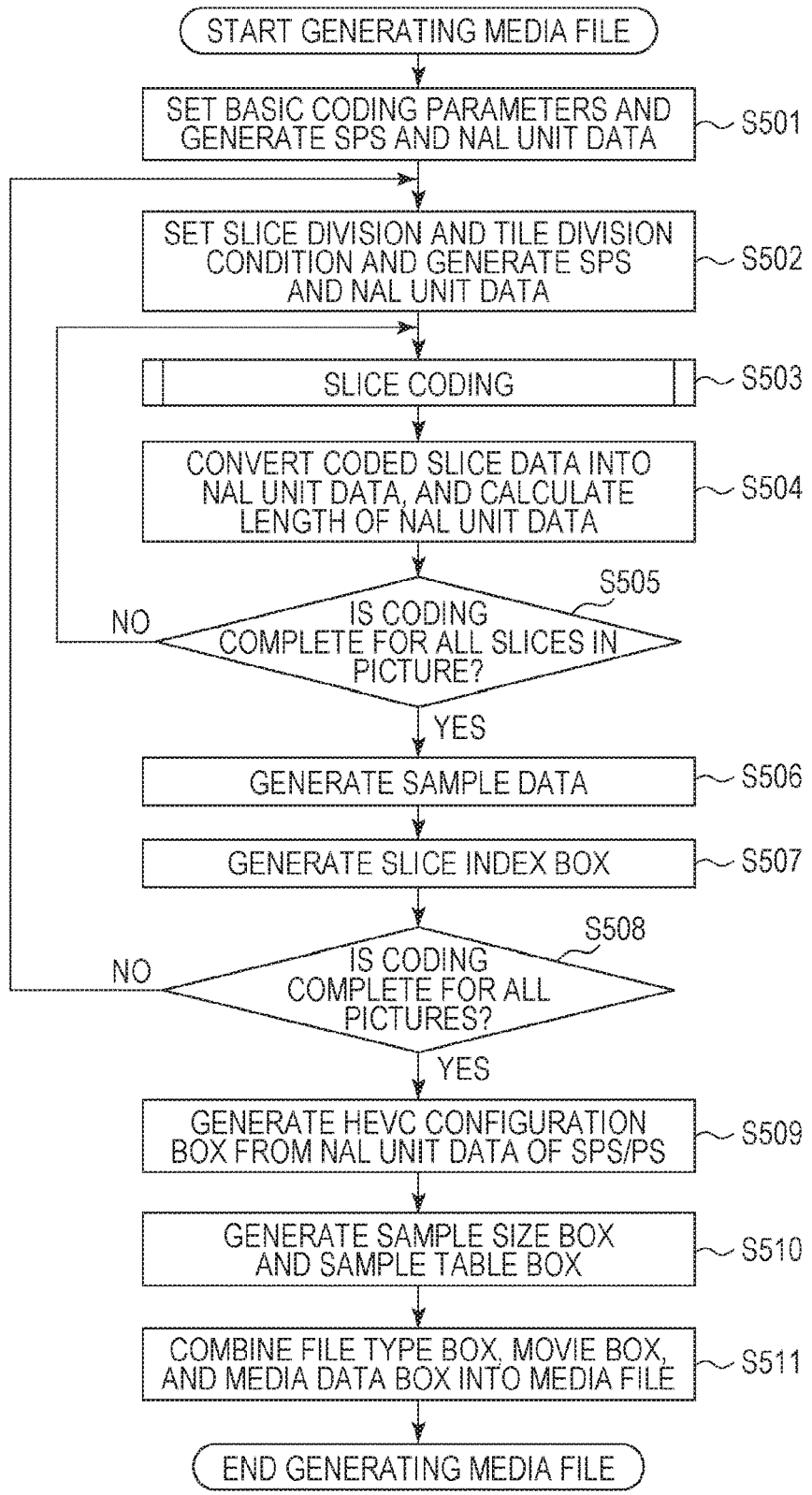
FIG. 5 is a flow chart of a process of generating a media file according to an embodiment.

FIG. 5 is a flow chart illustrating a process of generating a media file according to the present embodiment.

In step S501, basic parameters in terms of an image size, a color difference format, and the like are externally set (by a user), and SPS, that is, a corresponding coding parameter set is generated. ANAL header is added to the generated SPS and thus NAL unit data is generated.

In step S502, parameters are externally set (by a user) to specify how to divide each picture into slices and tiles, and put together with quantization parameters and the like in a corresponding coding parameter set PPS. ANAL header is added to the generated PPS and thus NAL unit data is generated. In a case where the condition as to the slice division and the tile division for second and following pictures, as the condition for the first picture, the setting in the step for the second and following pictures is skipped.

In step S503, each slice is coded according to the flow chart illustrated in FIG. 4. In step S504, a NAL header is added to the coded slice data generated in step S503 thereby generating NAL unit data. The coded data length (in bytes) of the NAL unit data is then calculated by determining the sum of the data lengths of the respective pieces of coded tile data calculated in step S404 of FIG. 4, the data length of the slice header, and the data length (1 byte) of the NAL header.

In step S505, a determination is performed as to whether coding is complete for one picture. If the coding is compete for one picture, the processing flow proceeds to step S506, but otherwise the processing flow returns to step S503 to code a following slice. In step S506, the NAL unit data including the coded slice data and the data length thereof are multiplex for one picture into one piece of sample data 111. In step S507, the slice indexes generated in step S404 of FIG. 4 are collected together into the slice index box 105 illustrated in FIG. 3.

In a case where all pictures in one movie sequence are divided into slices and tiles in the same manner as illustrated in FIG. 2, only one slice index box 105 exists in one sequence, and thus step S507 is skipped for second and following pictures. At some picture in the middle of one sequence, the slice dividing mode and the tile dividing mode may be changed from those illustrated in FIG. 2. In this case, in step S507, at a picture at which the slice dividing mode and the tile dividing mode are changed, an additional slice index box 105 may be inserted, or one or more entries may be added to the existing slice index box 105.

In step S508, a determination is performed as to whether coding is complete for all pictures specified to be coded. In a case where the coding is complete for all pictures, the processing flow proceeds to step S509, but otherwise the processing flow returns to step S502 to code a following picture.

In step S509, NAL unit data of the coding parameter sets SPS and PPS generated in step S501 and step S502 is stored in a HEVC configuration box 104. The storing of SPS and PPS into the HEVC configuration box 104 may be performed in the same manner as the manner of storing SPS and PPS into an AVC configuration box described in Section 5.2.4.1 of NPL 2, and thus a further description thereof is omitted.

In step S510, a sample size box 103 is generated based on the data length of the sample data 111 generated in step S506. A sample table box 102 is then generated by multiplexing the generated sample size box 103, the slice index box 105 generated in step S507, and the HEVC configuration box 104 generated in step S509. In step S511, the file type box 100, the movie box 101 including the sample table box 102, and the media data box 110 including the sample data 111 are multiplexed into a media file, and thus the generation of the media file is complete.

Figure 6:
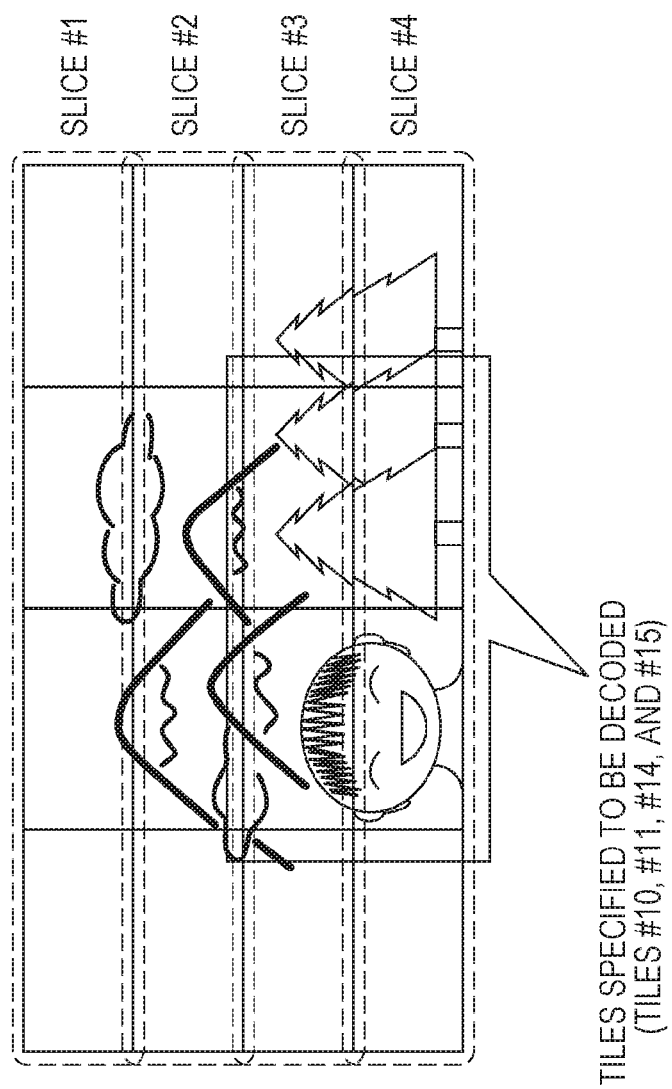
FIG. 6 is a diagram illustrating a use case in which only particular tiles are extracted from a media file and played back according to an embodiment.

FIG. 6 illustrates a use case of playing back a media file according to the present embodiment. In the use case illustrated in FIG. 6, only tiles #10, #11, #14, and #15 are extracted from the coded data coded using the slice division and the tile division illustrated in FIG. 2, and the extracted tiles are displayed and played back. Referring to a flow chart illustrated in FIG. 7, a process of playing back part of a media file by extracting only particular tiles as illustrated in FIG. 6 from the media file generated based on the media file format according to the present embodiment.

In step S701, the HEVC configuration box 104 stored in the sample table box 102 in the read media file is analyzed to extract SPS and PPS.

In step S702, tile-to-be-decoded information indicating tiles to be decoded (to be displayed) is set externally (by a user). The tiles to be decoded may be specified arbitrarily by a user, for example, based on thumbnails or the like of the movie.

In step S703, the slice index box 105 stored in the sample table box 102 is analyzed. That is, slices to be decoded are determined based on the slice index in the slice index box 105 and the tile-to-be-decoded information set in step S702.

For example, in a case where the tile-to-be-decoded information indicates that tiles #10, #11, #14, and #15 are to be decoded as illustrated in FIG. 6, the slices to be decoded are determined as the slice #3 and the slice #4 from the slice index illustrated in FIG. 3B.

In step S704, NAL unit data including slices determined, in step S703, to be decoded is read from the sample data 111 including the coded data of the pictures to be decoded. In a case where playback is performed in a normal mode from the beginning of a movie sequence, the analysis on the sample size box 103 is not necessary. However, to play back the movie sequence from somewhere in the middle thereof, the sample size box 103 is analyzed and sample data 111 of pictures to be decoded is read.

It is possible to quickly access slices to be decoded based on the NAL unit data length described in front of each NAL unit data in the sample data 111. For example, to access NAL unit data including the slice #3, the slice #1 is skipped according to the coded data length described in front of the NAL unit data of the slice #1. If the NAL unit data of the slice #2 is skipped in a similar manner, the beginning of the NAL unit data including the coded data of the slice #3 is quickly reached.

In step S705, the slice header of the slice including tiles to be decoded is analyzed and coding parameters to be used in the decoding of the tiles are decoded. The slice header includes slice_segment_addres described in NPL 1 to indicate a location of each slice in a picture. By checking the location of each slice in the picture and the information on the division into tiles described in PPS analyzed in step S701, it is possible to calculate the relationship between the coded slice data and the tiles to determine which tile in the slice is to be decoded. For example, in FIG. 2, it is possible to indicate, by calculation, that the start position of the slice #3 corresponds to the tile #9. In the example illustrated in FIG. 6, it is possible to indicate, by calculation, that the second tile (tile #10) in the slice #3 is a tile to be decoded. Furthermore, entry_point_offset is decoded from the slice header to acquire the offset indicating the offset of each coded data of the tile to access.

In step S706, based on entry_point_offset decoded in step S705, the coded data of the tile specified in the tile-to-be-decoded information is read and decoded. The decoding in the tile may be performed in a similar manner to a general manner of decoding coding tree block, and thus a further description thereof is omitted.

In step S707, a determination is performed as to whether the decoding is complete for all tiles, specified to be decoded, in the slice. More specifically, in the example illustrated in FIG. 6, it is specified to decode two tiles from each of the slices #3 and #4. In a case where the decoding is complete for all tiles to be decoded, the processing flow proceeds to step S708, but otherwise the processing flow returns to step S706 to decode a following tile.

In step S708, a determination is performed as to whether the process is complete f or all slices including tiles to be decoded. For example, in the case illustrated in FIG. 6, it is necessary to process two slices, that is, the slice #3 and the slice #4. In a case where the process is complete for all slices including tiles to be decoded (when the process is complete up to the slice #4 in the case illustrated in FIG. 6), the processing flow proceeds to step S709, but otherwise, the processing flow returns to step S704 to decode a following slice.

In step S709, all tiles decoded in step S706 are output. In step S710, a determination is performed as to whether the decoding is complete for all pictures to be played back in the media file. In a case where the process is complete for all pictures to be played back, the decoding process is ended, but there are more pictures to be played back, the processing flow returns to step S701 to analyze and decode PPS of a following picture. Note that in a case where there is no change in the tile-to-be-decoded information and the slice dividing mode and the tile dividing mode in the process for the following picture, step S702 and step S703 are skipped. There is no change in terms of the slice dividing mode and the tile dividing mode when there is only one slice index box and all slice indexes in the slice index box are used in the process on the first picture. Step S701 includes a process associated with PPS, and thus analysis may be perform on each picture.

Figure 7:
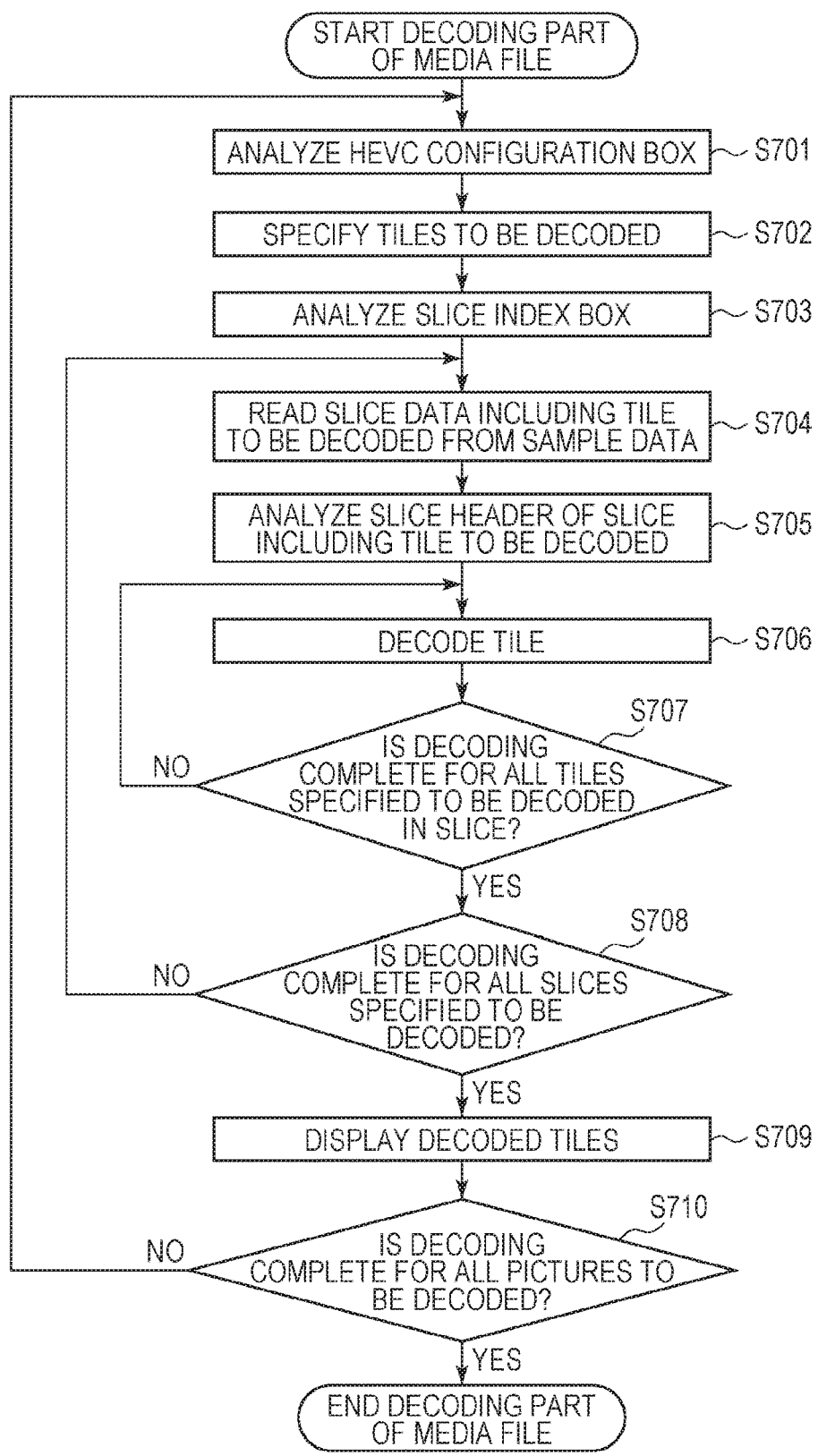
FIG. 7 is a diagram illustrating a flow chart of a process of extracting only particular tiles from a media file and playing back them according to an embodiment.

Note that the flow chart illustrated in FIG. 7 is of a normal playback mode. By properly changing the manner of controlling steps in units of pictures, it is possible to easily achieve a special playback mode such as a fast forward playback mode or the like.

As described above, in decoding and displaying only particular tiles, use of the slice index box 105 allows it to decode only the slice headers and tiles to be decoded. In decoding of a movie, a majority of the process is spent to decode coding tree blocks, and thus the partial decoding using the slice index box 105 allows a great increase in decoding speed and a great reduction in power consumption compared to the case where decoding is performed for the entire picture area or all slices. For example, in the use case illustrated in FIG. 6, decoding only tiles specified to be decoded and having a size only one fourth the size of the picture results in a reduction in decoding time to about one third that of the case where the entire picture area is decoded. In a case where the present embodiment is implemented in the form of a software program and the software program is executed by a CPU, the electric power consumed by the CPU in the process is reduced to about one third.

Another advantageous effect provided by the present embodiment is that the provision of the slice index box 105 (sidx) according to the present embodiment allows it to recognize, in the playback of the media file, that the tile size is smaller than the slice size. Because it is possible to decode each tile independently, not only in the use case in which only particular tiles are displayed or played back, but also in a use case in which the whole picture is decoded, a reduction in the memory used in the display or playback process is achieved. The recognition on the relative size between tiles and slices makes it possible to use as much memory as necessary to decode one tile instead of using more memory necessary to decode the one whole slice. By decoding tiles sequentially while sharing the same memory area among different tiles, it is possible to reduce the memory size used in the decoding.

Note that the data length of each data in the slice index box 105, the slice dividing mode, and the tile dividing mode, the character string used as the name or the identifier of the slice index box 105, the insertion locations in the media file, and other parameters are not limited to the examples described above.

In the present embodiment described above, it is assumed by way of example that only particular tiles of a movie are extracted played back. Note that the technique according to the present embodiment is also applicable to other situations. For example, the technique may be applied to a case where one still image is coded according to the HEVC standard and stored in a media file. As another example, in a use case in which a still image is synthesized from a plurality of pictures, only particular tiles may be extracted according to the technique according to the present embodiment described above.

Second Embodiment

In a second embodiment described below, as in the first embodiment, coding is performed such that one slice includes a plurality of tiles.

Figure 8:
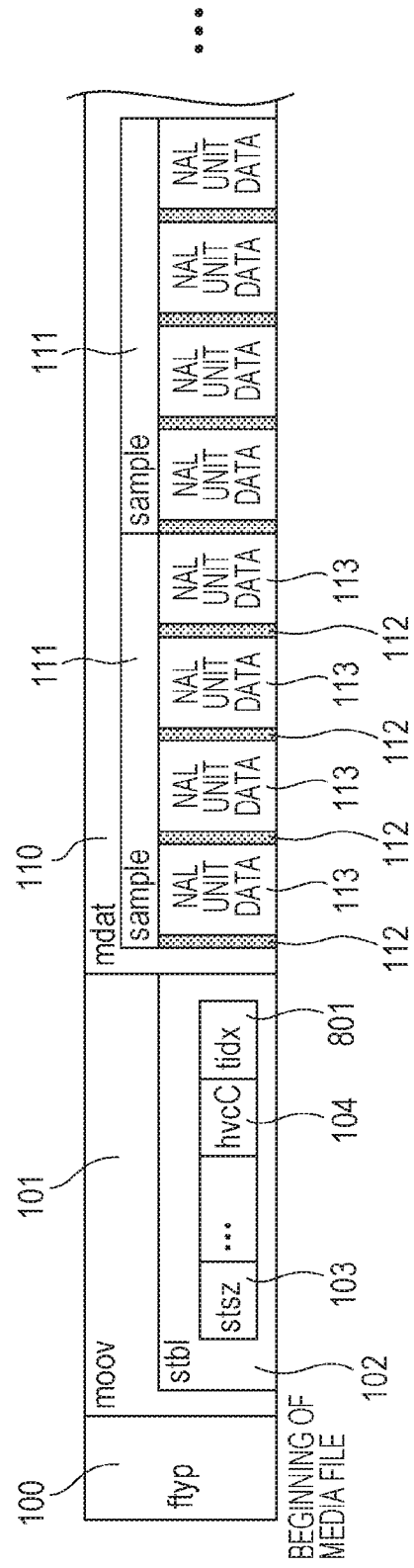
FIG. 8 is a diagram illustrating a media file format according to an embodiment.

FIG. 8 illustrates a media file format according to the second embodiment. In FIG. 8, similar boxes and data to those illustrated in FIG. 1 are denoted by similar reference symbols, and a further description thereof is omitted. As illustrated in FIG. 8, in the sample table box 102, the slice index box 105 illustrated in FIG. 1 is replaced by the tile index box 801.

FIG. 9A illustrates a format of the tile index box 801, and FIG. 9B illustrates an example of a content of the tile index box 801. In the present embodiment, it is assumed by way of example that dividing into slices and tiles is performed in a similar manner to that illustrated in FIG. 2. As illustrated in FIG. 9A, in the tile index box 801 according to the present embodiment, tile indexes of the tiles at the beginnings of the respective slices (the tile indexes indicating the positions in each picture, expressed in ordinal numbers) are stored in the order of coding slices. It is self-evident that the beginning of the first (as in the coding order) slice (slice #1) includes a first (as in the coding order) tile (tile #1), and thus no tile index is inserted for the slice #1. As illustrated in FIG. 2, a fifth tile is located at the beginning of the slice #2 and thus 4 is stored as the tile index therefor. Similarly, for following slices, tile indexes indicating the tiles at the beginning positions are stored. When the number of tiles included in a picture is equal to M, each tile index takes one of values in a range from 1 to (M−1).

In the present embodiment, a character string "tidx" (Tile Index) is used as an identifier to identify the tile index box 801. In the box size, the total data length of the tile index box is described as in the first embodiment. The number of entries is equal to the number of slices in the picture minus 1. The data length of each entry is equal to 2 bytes.

By using the tile index box 801 instead of the slice index box 105 used in the first embodiment, a media file may be generated in a similar manner to the first embodiment described above with reference to FIG. 4 and FIG. 5. However, step S507 in FIG. 5 is performed differently from that according to the first embodiment in that a tile index indicating a first-position tile is generated once for each slice and is stored in the tile index box 801.

Also in the case where a media file is partially played back while extracting only particular tiles, the playback process may be performed in a similar manner to that according to the first embodiment described above with reference to FIG. 7 by using the tile index box 801 instead of the slice index box 105. However, step S703 in FIG. 7 is performed differently from that according to the first embodiment in that the tile-to-be-decoded information (set in step S702 in FIG. 7) is compared with the tile index included in the tile index box 801. In a case where the tile index of the tile to be decoded is X, an entry is searched for that is the greatest in a range equal to or smaller than X. It is possible to identify a slice including the tile to be decoded based on the position, expressed using an ordinal number, of the entry.

By way of example, let it be assumed that when the tile index box 801 has a content such as that illustrated in FIG. 9B, a slice including a tile #1 (tile index=9) is searched for. In FIG. 9B, a third entry has the greatest tile index, 8, in the range equal to or smaller than 9. Thus, the process of playing back the media file is capable of identifying that the tile #10 is included in the slice #3. Thus, as in the first embodiment, by analyzing the slice header of the slice #3 and decoding only coded data of the tile #10, it is possible to quickly decode only the tile #1.

As described above, in the present embodiment, advantageous effects similar to those achieved in the first embodiment are achieved using the tile index box 801. In the present embodiment, as in the first embodiment, the data length and the content of each data in the tile index box 801, and the manner of dividing the picture into slices and tiles are not limited to the examples described above. Furthermore, the technique disclosed in the present embodiment may also be applied to a media file in which a still image is stored.

Third Embodiment

In a third embodiment described below, as in the first embodiment, coding is performed such that one slice includes a plurality of tiles.

Figure 10:
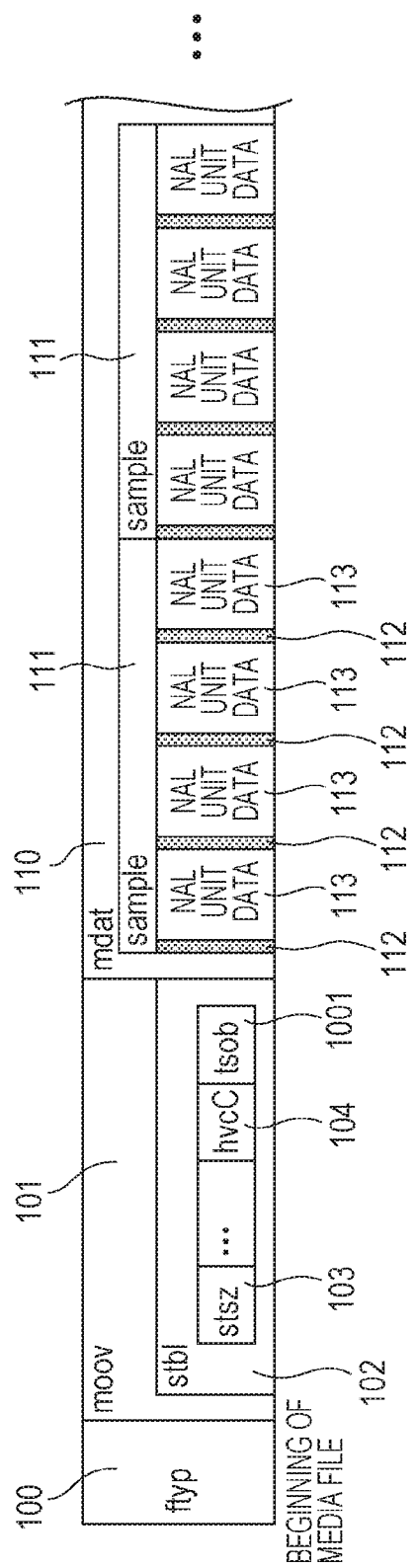
FIG. 10 is a diagram illustrating an example of a media file format according to an embodiment.

FIG. 10 illustrates a media file format according to the third embodiment. In FIG. 10, similar boxes and data to those illustrated in FIG. 1 are denoted by similar reference symbols, and a further description thereof is omitted. As illustrated in FIG. 10, in the sample table box 102, the slice index box 105 illustrated in FIG. 1 is replaced by the tile offset box 1001.

FIG. 11A illustrates a format of the tile offset box 1001 according to the present embodiment. FIG. 11B illustrates an example of a content of the tile offset box 1001. As illustrated in FIG. 11A, in the tile offset box 1001 according to the present embodiment, the number of tile offset bytes is stored to indicate the offset in units of bytes from the beginning of each sample data 111 to the beginning of coded data of a tile of interest. The location of a tile at the beginning of a picture is self-evident, and thus the number of tile offset bytes for the tile #1 is not stored. In the present embodiment, a character string "tsob" (Tile in Slice Offset Byte) is used as an identifier to identify the tile offset box 1001. In the box size, the total data length of the tile offset box 1001 is stored as in the first embodiment. The number of entries is equal to the number of tiles in the picture minus 1. The data length of each entry is equal to 4 bytes.

By using the tile offset box 1001 instead of the slice index box 105 used in the first embodiment, a media file may be generated in a similar manner to the first embodiment described above with reference to FIG. 4 and FIG. 5. However, step S507 in FIG. 5 is performed differently from that according to the first embodiment in that the coded data length of coded data generated in the coding of slices in step S503 in FIG. 5 is cumulatively added together in the tile and in the picture, and the offset in units of bytes is calculated from the beginning of the sample data 111 to the beginning of coded data of each tile. A tile offset box 1001 is generated by soring therein as many pieces of data indicating the number of tile offset bytes as the number of tiles in the picture minus 1.

In the storing the number of tile offset bytes in the tile offset box 1001, the number of tile offset bytes may vary even when the manner of dividing a picture into tiles and slices is equal to that for a previous picture. Therefore, step S507 in FIG. 5 is not skipped, and as many tile offset boxes 1001 are generated as there are pictures (or as many pieces of data of number of entries are described as the number of tiles x the number of pictures).

Also in the case where a media file is partially played back while extracting only particular tiles, the playback process may be performed in a similar manner to that according to the first embodiment described above with reference to FIG. 7 by using the tile offset box 1001 instead of the slice index box 105. However, step S703 in FIG. 7 is performed differently from that according to the first embodiment in that the tile offset box 1001 is analyzed instead of the slice index box 105.

In step S704, a tile to be decoded is determined based on the tile-to-be-decoded information set in step S702, the number of tile offset bytes analyzed in step S703, and the data length of each NAL unit data in the sample. After the slice header is analyzed in step S705, the coded data of the tile is read in step S706 based on the number of tile offset bytes.

By storing data of the number of tile offset bytes in the tile offset box 1001 tile offset box 1801 as described above, advantageous effects similar to those achieved in the first embodiment are achieved, and furthermore it becomes possible to more quickly access coded data of the tile to be decoded, which allows a reduction in decoding time.

In the present embodiment, as in the first embodiment, the data length and the content of each data in the tile offset box 1001, the manner of dividing the picture into slices and tiles are not limited to the examples described above. Furthermore, the technique disclosed in the present embodiment may also be applied to a media file in which a still image is stored. In the present embodiment, the number of tile offset bytes indicates the offset from the beginning of the sample data 111 to the beginning of coded data of each tile. Alternatively, the number of tile offset bytes may indicate the offset from the beginning of coded data of each tile to the beginning of coded data of a next tile, or the number of tile offset bytes may indicate the offset to the beginning of coded data of a slice including each tile.

Fourth Embodiment

A media file format according to a fourth embodiment described below is applicable to a case where coding is performed such that one tile includes a plurality of slices.

Figure 12:
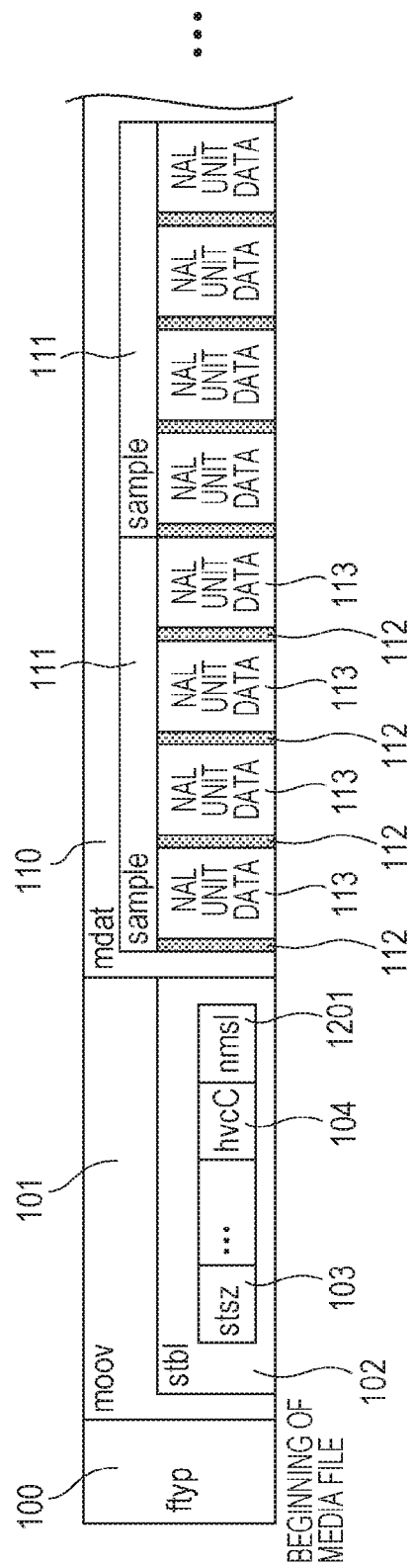
FIG. 12 is a diagram illustrating an example of a media file format according to an embodiment.

FIG. 12 illustrates a media file format according to the fourth embodiment. In FIG. 12, similar boxes and data to those illustrated in FIG. 1 are denoted by similar reference symbols, and a further description thereof is omitted. As illustrated in FIG. 12, in the sample table box 102, the slice index box 105 illustrated in FIG. 1 is replaced by the number-of-slices-in-tile box 1201.

Figure 13:
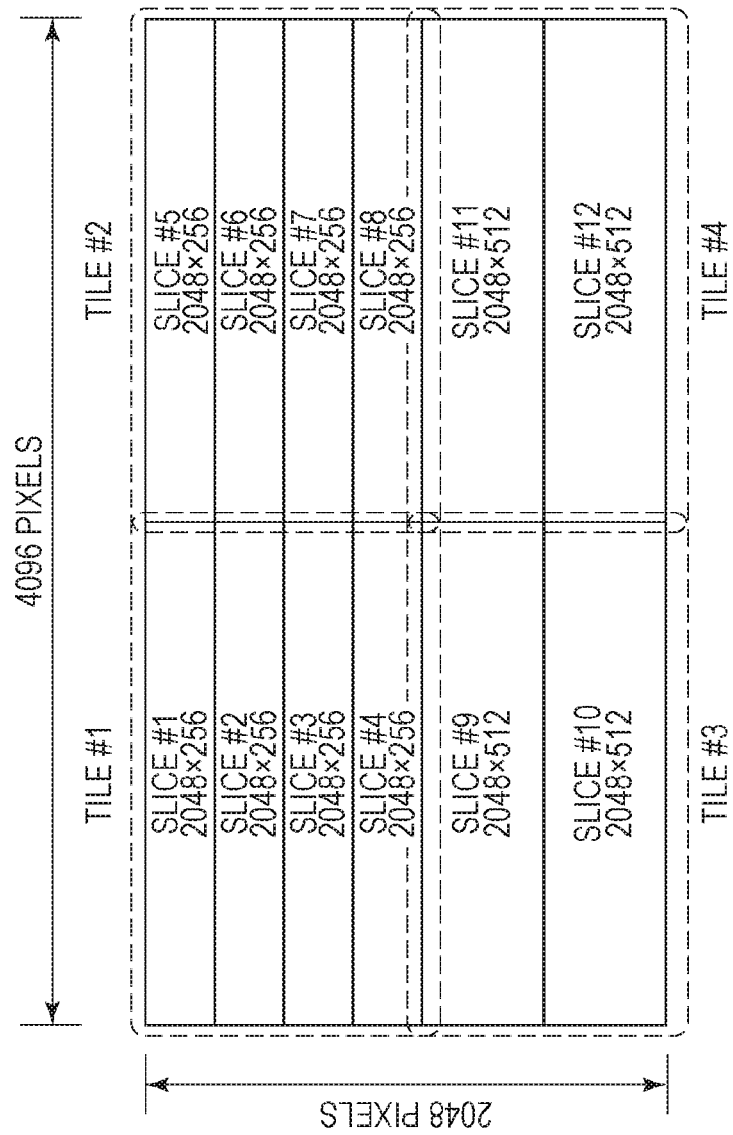
FIG. 13 is a diagram illustrating an example of a manner of dividing a picture into slices and tiles according to an embodiment.

FIG. 13 illustrates an example of a manner of dividing a picture into slices and tiles according to the present embodiment. FIG. 14A illustrates a format of the number-of-slices-in-tile box 1201 according to the present embodiment. FIG. 14B illustrates an example of a content of the number-of-slices-in-tile box 1201. As illustrated in FIG. 14A, in the main body of the number-of-slices-in-tile box 1201 according to the present embodiment, the number of slices included in each tile is described. In the present embodiment, a character string "nmsl" (The Number of SLice In Tile) is used as an identifier to identify the number-of-slices-in-tile box 1201. In the box size, as in the previous embodiments, the total data length of the whole number-of-slices-in-tile box 1201 is described. The number of entries is equal to the number of tiles in the picture. The data length of each entry is equal to 2 bytes.

FIG. 14B illustrates an example of a content of the number-of-slices-in-tile box 1201 for a case in which the dividing into slices and the dividing into tiles are performed in a manner as illustrated in FIG. 13. In FIG. 13, the picture is divided into 4 tiles, and thus the number of entries in the number-of-slices-in-tile box 1201 is 4. The tile #1 and the tile #2 are each divided into 4 slices, and thus, in FIG. 14B, 4 is described as the number of slices in the tile of each of the tiles #1 and #2. On the other hand, the tile #3 is divided into 2 slices, and the tile #4 is divided into 2 slices, and thus 2 is described as the number of slices in the tile of each of the tiles #3 and #4.

Figure 15:
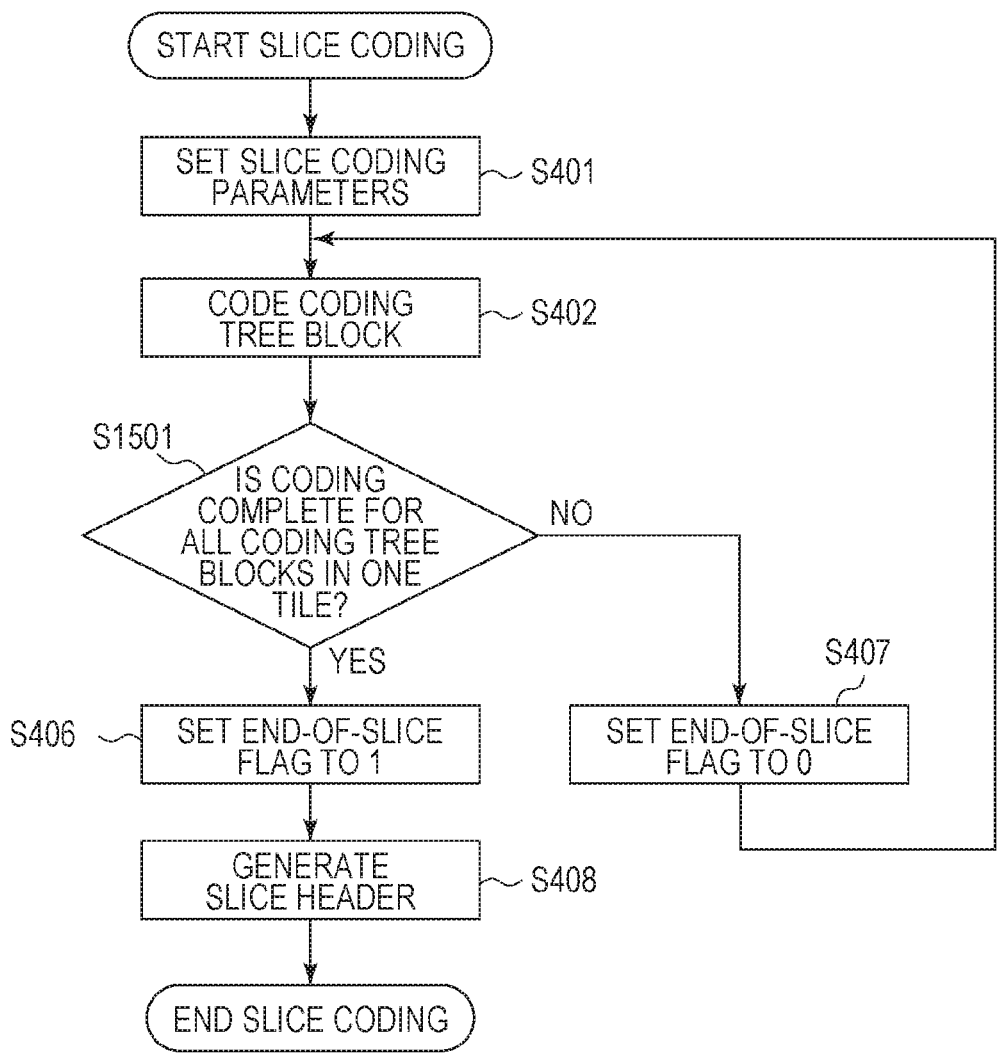
FIG. 15 is a flowchart of a process of coding a slice according to an embodiment.

Referring to flow charts illustrated in FIG. 15 and FIG. 16, a process of generating a media file is described below, for a case in which as illustrated in FIG. 13, coding is performed such that a picture is divided into a plurality of tiles each including a plurality of slices. FIG. 15 is a flow chart illustrating a process of coding each slice. In FIG. 15, steps similar to those in FIG. 4 are denoted by similar reference symbols, and a further description thereof is omitted.

In step S1501, a determination is performed as to whether coding is complete for all coding tree blocks in the slice. In a case where the coding is complete for all coding tree block, the processing flow proceeds to step S406 in FIG. 15, but otherwise the end-of-slice flag is coded to 0 and the processing flow returns to step S402 in FIG. 15 to code a following coding tree block.

Figure 16:
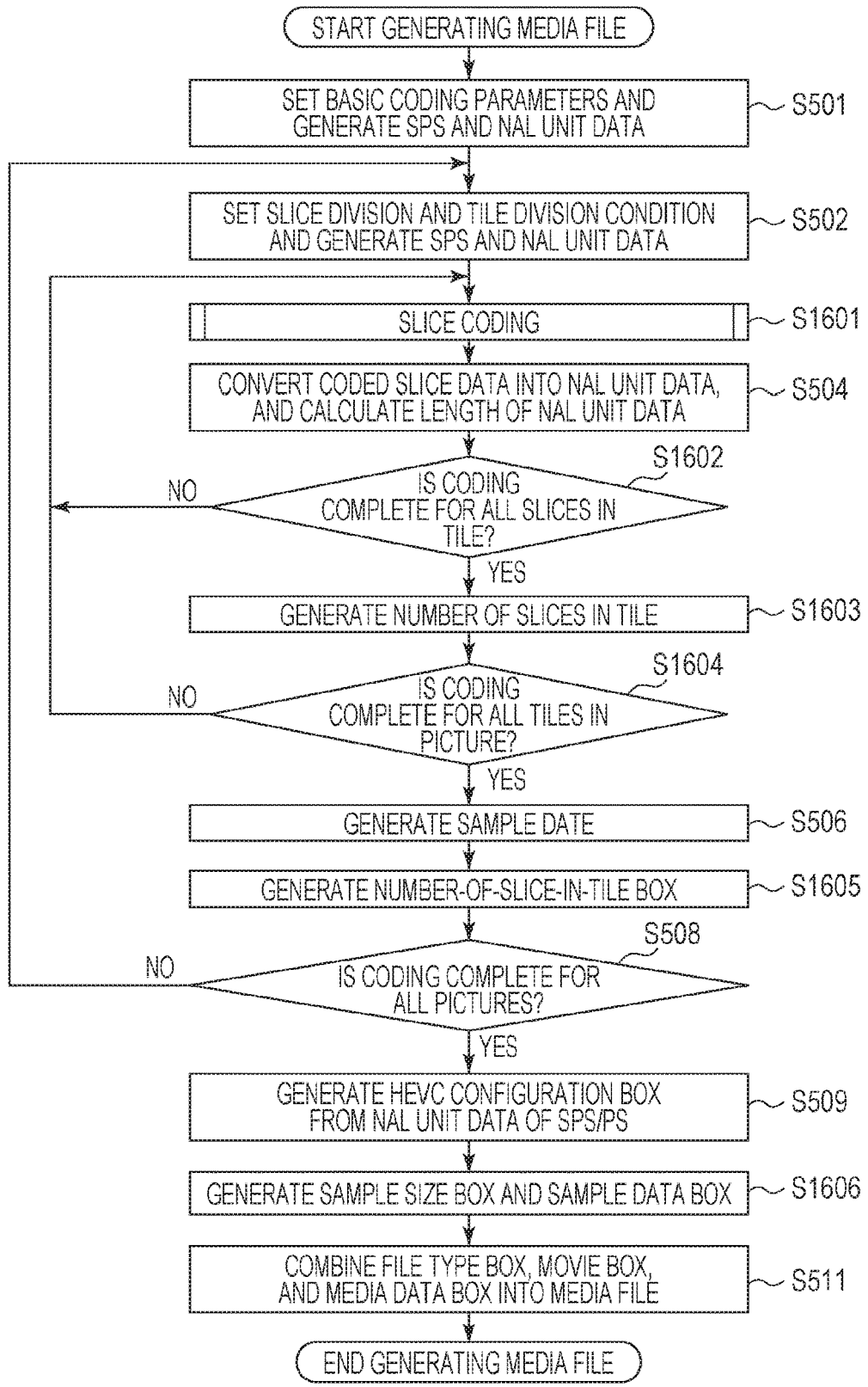
FIG. 16 is a flow chart of a process of generating a media file according to an embodiment.

FIG. 16 is a flow chart of a process of generating a media file according to the present embodiment. In FIG. 16, steps similar to those in FIG. 5 are denoted by similar reference symbols, and a further description thereof is omitted.

In step S1601, a slice is coded according to the flow chart illustrated in FIG. 15. In step S1602, a determination is performed as to whether coding is complete for all slices in a tile. When the coding is complete for all slices, the processing flow proceeds to step S1603, but otherwise the processing flow returns to step S1601 to code a following slice. In step S1603, based on information indicating the number of coded slices in the tile, the number of slices in the tile is generated.

In step S1604, a determination is performed as to whether coding is complete for tiles in the picture. If the coding is complete for tiles, the processing flow proceeds to step S506 in FIG. 16, but otherwise the processing flow returns to step S1601 to code a following tile. In step S1605, a number-of-slices-in-tile box 1201 is generated so as to indicate the total number of slices in all tiles generated in step S1603.

In step S1606, the sample size box 103 illustrated in FIG. 12 is generated based on the data length of the sample data 111 generated in step S506 in FIG. 16. A sample table box 102 is then generated by combining therein the generated sample size box 103, the number-of-slices-in-tile box 1201 generated in step S1605, and the HEVC configuration box 104.

Figure 17:
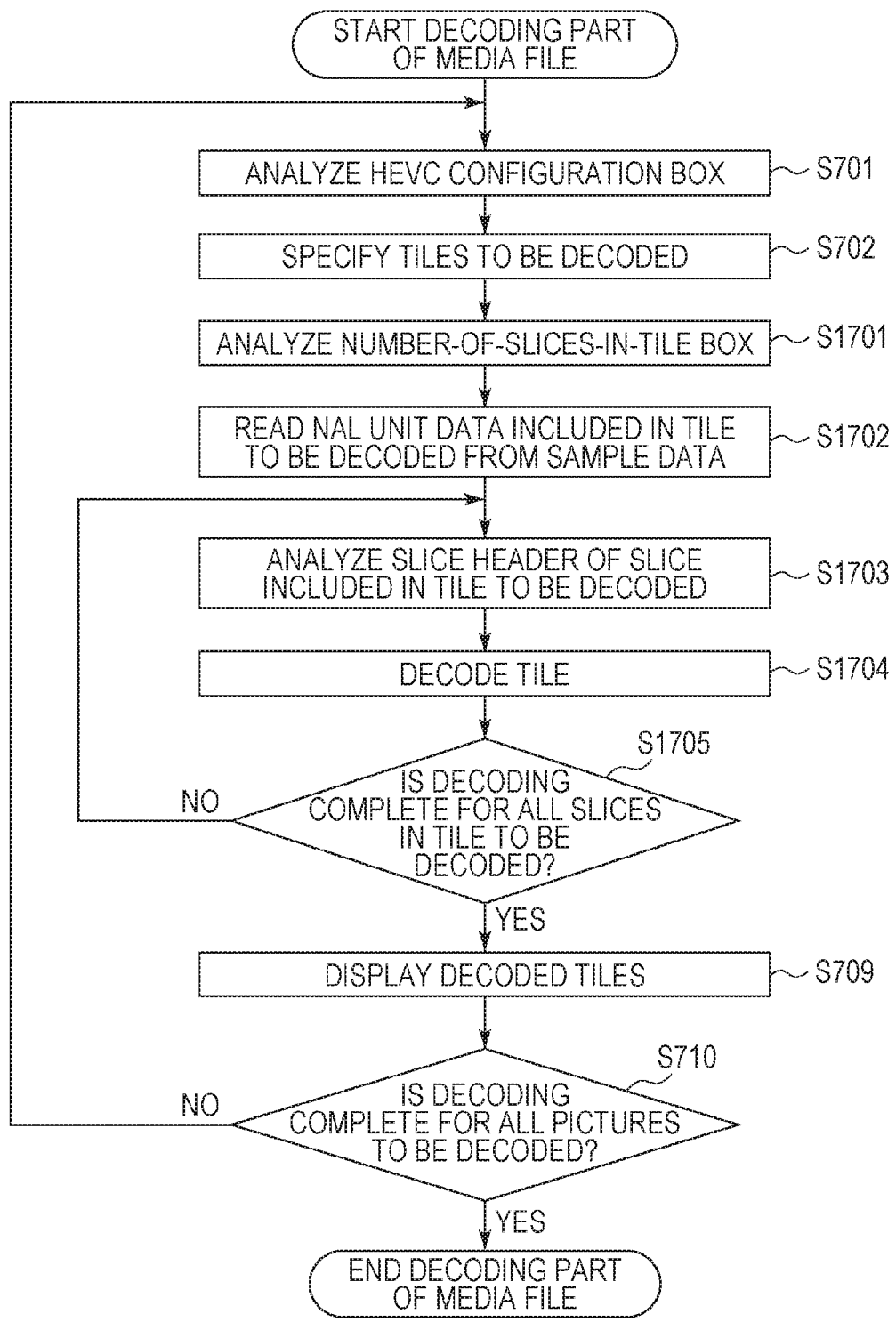
FIG. 17 is a diagram illustrating a flow chart of a process of extracting only particular tiles from a media file and playing back them according to an embodiment.

Referring to a flow chart illustrated in FIG. 17, a process of playing back part of a media file by extracting only particular tiles from the media file generated based on the media file format according to the present embodiment. In FIG. 17, it is assumed by way of example that only a tile #2 illustrated in FIG. 13 is specified as a tile to be decoded. In FIG. 17, steps similar to those in FIG. 7 are denoted by similar reference symbols, and a further description thereof is omitted.

In step S1701, the number-of-slices-in-tile box 1201 stored in the sample table box 102 illustrated in FIG. 12 is analyzed to acquire the number of slices in each tile. In step S1702, NAL unit data (coded data of slices) included in the tile specified to be decoded is read, as described below, based on the number of slices in the tile acquired in step S1701.

First, NAL unit data included in tiles prior in the coding order to the tile to be decoded is skipped. According to FIG. 14B, the number of slices in the tile #1 (which is prior, in the coding order, to the tile #2) is 4, and thus NAL unit data of 4 slices is skipped without being read. Skipping of NAL unit data may be easily performed based on the NAL unit data length attached to each NAL unit data.

Next, NAL unit data included in the tile specified to be decoded is read. According to FIG. 14B, the number of slices in the tile #2, which is a tile specified to be decoded, is 4, and thus 5th NAL unit data to 9th NAL unit data (coded data of 4 slices) are read. In step S1703, the slice header of each of the slices which are included in the tile to be coded and which were read in step S1702 is analyzed and coding parameters to be used in the decoding of the slice are decoded. In step S1704, decoding is performed on the coded data of the slice read in step S1702. The decoding in the slice may be performed in a similar manner to a general manner of decoding coding tree block, and thus a further description thereof is omitted.

In step S1705, a determination is performed as to whether the decoding is complete for all slices in the tile specified to be decoded. For example, in the case illustrated in FIG. 13, to decode the tile #2, it is necessary to decode the slices #5 to #8. In a case where the decoding is complete for all slices to be decoded, the processing flow proceeds to step S710 in FIG. 17, but otherwise the processing flow returns to step S1703 in FIG. 17 to decode a following slice.

By describing the number of slices in the tile in the number-of-slices-in-tile box 1201 as described above, it becomes possible to quickly access coded data in the tile to be decoded even in a case where a plurality of slices are included in one tile. In decoding of a motion picture, as described above a majority of the process is spent to decode coding tree blocks. For example, in the use case in which only the tile #2 illustrated in FIG. 13 is displayed, decoding only the tile #2 having a size only one fourth the size of the picture results in a reduction in decoding time to about one third that of the case where the whole picture is decoded. In a case where the present embodiment is implemented in the form of a software program and the software program is executed by a CPU, the electric power consumed by the CPU in the process is reduced to about one third.

Another advantageous effect provided by the present embodiment is that the provision of the number-of-slices-in-tile box 1201 (nmsl) according to the present embodiment allows it to recognize, in the playback of the media file, that the tile size is greater than the slice size. For example, in a case where HEVC coded data is decoded in parallel by a multi-core CPU, it is possible to perform a determination, based on the relative size between tiles and slices, as to whether a plurality of slices are decoded in parallel or a plurality of tiles are decoded in parallel.

Note that the slice index box 105 (sidx) according to the first embodiment may be used together with the number-of-slices-in-tile box 1202 (nmsl) according to the fourth embodiment. In a case where a plurality of tiles are included in one slice, it is possible to indicate that the plurality of tiles are included in one slice by setting, to 1, the number-of-slices-in-tile box of this tile in the number-of-slices-in-tile box 1201. In a case where a plurality of slices are included in one tile, it is possible to indicate that the plurality of slices are included in one tile by setting, to 1, each slice index in the slice index box 105.

Note that the data length of each data in the number-of-slices-in-tile box 1201, the slice dividing mode, and the tile dividing mode, the character string used as the name or the identifier of the number-of-slices-in-tile box 1201, the insertion locations in the media file, or other parameters are not limited to the examples described above. The embodiments described above are also applicable to a media file in which still images are stored. The storage location of the number-of-slices-in-tile box 1201 is not limited to that described above, but it may be stored in a VUI (video display information) parameter or a SEI (supplementary enhancement information) parameter, which is PPS or SPS parameter.

Fifth Embodiment

In a fifth embodiment described below, as in the fourth embodiment, coding is performed such that one tile includes a plurality of slices.

Figure 18:
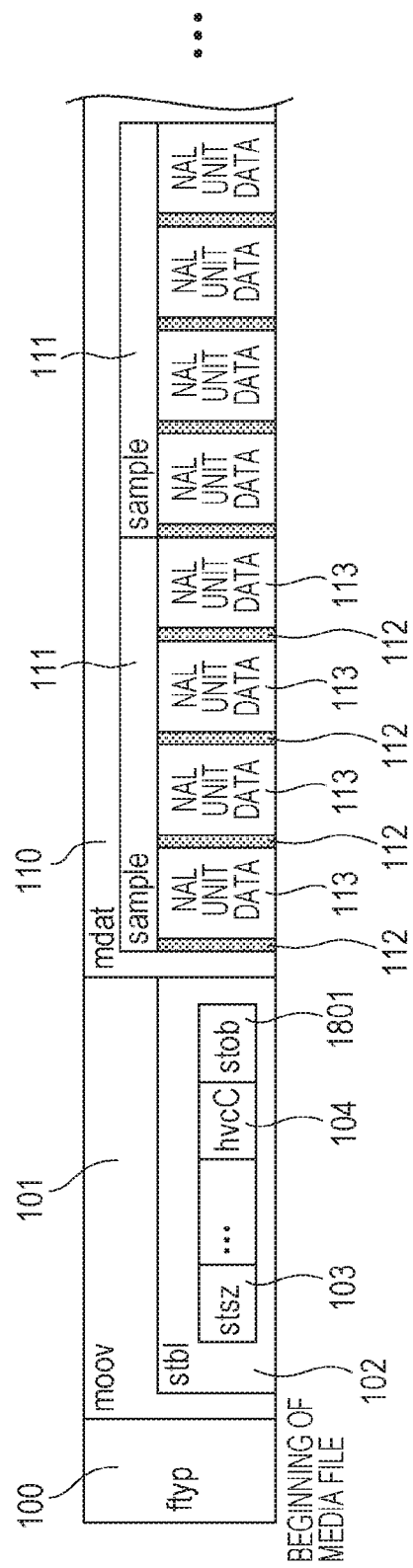
FIG. 18 is a diagram illustrating an example of a media file format according to an embodiment.

FIG. 18 illustrates a media file format according to the fifth embodiment. In FIG. 18, similar boxes and data to those illustrated in FIG. 1 are denoted by similar reference symbols, and a further description thereof is omitted. As illustrated in FIG. 18, in the sample table box 102, the slice index box 105 illustrated in FIG. 1 is replaced by the tile offset box 1801.

FIG. 19A illustrates a format of the tile offset box 1801 according to the present embodiment. FIG. 19B illustrates an example of a content of the tile offset box 1801. In this format, as illustrated in FIG. 19A and FIG. 19B, an offset from the beginning of sample data 111 to NAL unit data in which a slice at the beginning of a tile is described as the number of tile offset bytes for each tile. In the present embodiment, a character string "stob" (Slice in Tile Offset Byte) is used as an identifier to identify the tile offset box 1801. In the box size, the total data length of the tile offset box 1801 is stored as in the first embodiment. The number of entries is equal to the number of tiles in the picture. The data length of each entry is equal to 4 bytes.

By using the tile offset box 1801 instead of the number-of-slices-in-tile box 1201 used in the fourth embodiment, a media file may be generated in a similar manner to the fourth embodiment described above with reference to FIG. 15 and FIG. 16. However, step S504 in FIG. 16 is performed differently from that according to the fourth embodiment in that the coded data length of a tile is determined by calculating the sum of the data length of NAL unit data of coded data of each slice in the one entire tile. In step S1603 in FIG. 16, by calculating the sum of coded data lengths of tiles in a picture, it is possible to determine the number of tile offset bytes for the particular tile. The tile offset box 1801 is generated by storing the number of tile offset bytes for each of tiles included in a picture (except for a first tile whose number of tile offset bytes is self-evident).

Also in the case where a media file is partially played back while extracting only particular tiles, the playback process may be performed in a similar manner to that according to the fourth embodiment described above with reference to FIG. 17 by using the tile offset box 1801 instead of the number-of-slices-in-tile box 1201. However, a difference is in that the number of tile offset bytes in the tile offset box 1801 obtained in step S1701 is used to step S1702 thereby making it possible to directly access NAL unit data corresponding to a slice at the beginning of the tile to be decoded.

In the fourth embodiment, NAL unit data included in tiles prior to the tile to be decoded is skipped without being read. In contrast, in the present embodiment, by using the number of tile offset bytes, it is possible to more quickly reach the NAL unit data of the slice at the beginning of the tile to be decoded. The number of tile offset bytes may vary even when the manner of dividing a picture into tiles and slices is equal to that for a previous picture. Therefore, step S1701 in FIG. 17 is not skipped, and as many tile offset boxes 1801 are generated as there are pictures (or as many pieces of data of number of entries are described as (the number of tiles−1)×(the number of pictures)).

By storing data of the number of tile offset bytes in the tile offset box 1801 as described above, advantageous effects similar to those achieved in the fourth embodiment are achieved, and furthermore it becomes possible to more quickly access coded data of the tile to be decoded, which allows a reduction in decoding time.

In the present embodiment, as in the fourth embodiment, the data length and the content of each data in the tile offset box 1801, and the manner of dividing the picture into slices and tiles are not limited to the examples described above. Furthermore, the technique disclosed in the present embodiment may also be applied to a media file in which a still image is stored.

In the present embodiment, the number of tile offset bytes indicates the offset from the beginning of the sample data 111 in FIG. 18 to the beginning of NAL unit data corresponding to a slice at the beginning of each tile. Alternatively, the number of tile offset bytes may indicate the offset from the beginning of NAL unit data corresponding to a slice at the beginning of each tile to NAL unit data corresponding to a slice at the beginning of a next tile. The storage location of the tile offset box 1801 is not limited to that described above, but it may be stored in a VUI (video display information) parameter or a SEI (supplementary enhancement information) parameter, which is PPS or SPS parameter.

Sixth Embodiment

In a sixth embodiment described below, coding is performed using an MCTS SEI message such that a group of pictures includes a set of MCTS tiles. As described in NPL 4, in a case where coding is performed using an MCTS tile set, it is possible to decode only a particular tile set in a sequence of successive pictures independently of other tiles and display the decoded tile set as a partial motion picture. Each picture is allowed to include a plurality of MCTS tile sets, and it is allowed to use a tile set ID (mot_sid in NPL 4), which is an identifier of a tile set, to identify a tile set to be decoded as a partial motion picture.

Figure 21:
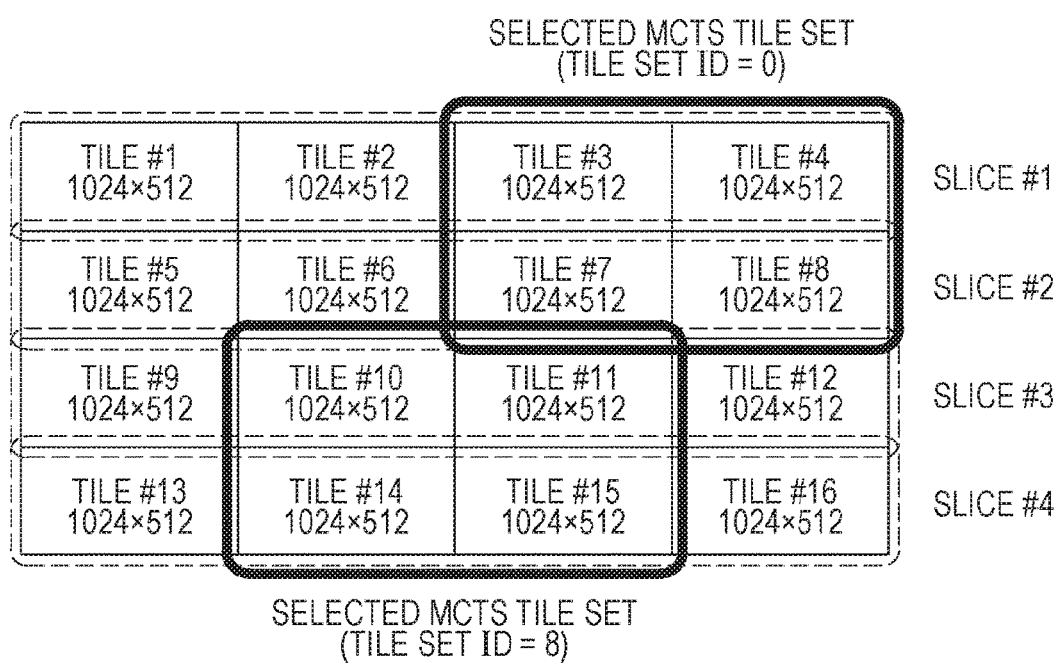
FIG. 21 is a diagram illustrating a tile set coded as MCTS according to an embodiment.

FIG. 21 illustrates an example in which coding is performed using MCTS for pictures each of which is divided into slices and tiles in the same manner as in FIG. 2. In this example, each picture includes two MCTS tile sets one of which includes a rectangular tile region including tiles #3, #4, #7, and #8 and have a tile set ID of 0, and the other one of which includes a rectangular tile region including tiles #10, #11, #14, and #15 and have a tile set ID of 8.

Figure 22:
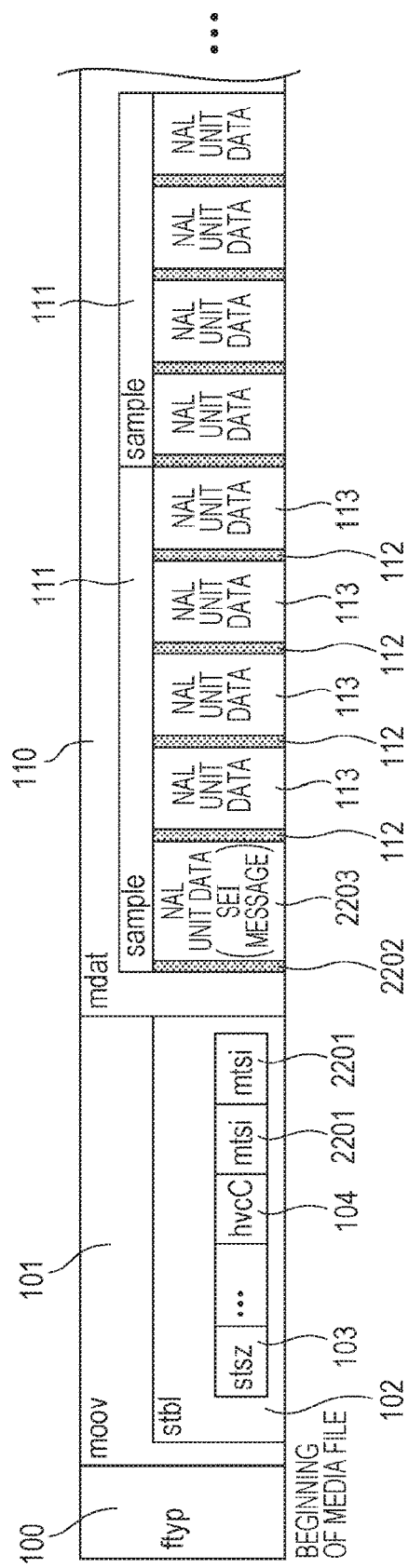
FIG. 22 is a diagram illustrating a media file format according to an embodiment.

FIG. 22 illustrates a media file format according to the present embodiment. In FIG. 22, similar boxes and data to those illustrated in FIG. 1 are denoted by similar reference symbols, and a further description thereof is omitted. The media file illustrated in FIG. 22 corresponds to MCTS illustrated in FIG. 21. In this media file, as many MCTS slice index boxes 2201 as there are tile sets, that is, two MCTS slice index boxes 2201 are stored in the sample table box 102. In sample data 111 at the beginning, a set of NAL unit data 2203 corresponding to a SEI message and a data length 2202 of this NAL unit is stored in addition to NAL unit data 113 of coded slice data.

For example, in the HEVC coding process, by setting coding parameters in the MCTS SEI message in NPL 4 as described below, it is possible to perform coding using the MCTS tile sets selected as illustrated in FIG. 21. Of the parameters described in NPL 4, exact_sample_value_match_flag is not essential to the present embodiment, and thus a description thereof is omitted.

A parameter num_sets_in_message_minus1 is set to 1, that is, num_sets_in_message_minus1=1. This parameter is stored in the SEI message and indicates the number of tile sets coded as MCTS minus 1. When this parameter is set to 1, this means that the number of tile sets in FIG. 21 is 2.

For a first tile set located on the upper right of FIG. 21, parameters in the MCTS SEI message is set as follows.

A parameter mcts_id is set to 0, that is, mcts_id=0. This parameter is a tile set ID identifying a tile set of a plurality of tile sets defined in a picture. The parameter mcts_id may take an arbitrary value selected from a range fro 0 to 255. For example, when this parameter is set to 0, this means that the first tile set in FIG. 21 has a tile set ID of 0.

A parameter num_tile_rects_in_set_minus1 is set to 0, that is, num_tile_rects_in_set_minus1=0. Each tile set is allowed to include a plurality of rectangular tile groups each including a plurality of tiles in a rectangular region. The parameter num_tile_rects_in_set_minus1 is equal to the number of rectangular tile groups included in a tile set minus 1. When this parameter is set to 0, this means that the number of rectangular tile groups forming the first tile set in FIG. 21 is 1.

A parameter top_left_tile_index[0] [0] is set to 2, that is, top_left_tile_index[0] [0]=2. This parameter is an index of a tile located at the upper left in the rectangular tile group. When this parameter is set to 2, this means that the tile #3 in FIG. 21 is located at the upper left of a rectangular tile region forming the first tile set.

A parameter bottom_right_tile_index[0] [0] is set to 7, that is, bottom_right_tile_index[0] [0]=7. This parameter bottom_right_tile_index[0] [0] is an index of a tile located at the lower right in the rectangular tile group. When this parameter is set to 7, this means that a tile #8 in FIG. 21 is located at the lower right in the rectangular tile group forming the first tile set.

Similarly, parameters for the second tile set, that is, the tile set at the lower location in FIG. 21 are set as follows.
mcts_id=8
num_tile_rects_in_set_minus1=0
top_left_tile_index[1] [0]=9
bottom_right_tile_index[1] [0]=14

In an MCTS slice index box 2201 in FIG. 22 according to the present embodiment, information is described to indicate a slice in the picture whose coded data includes coded data of a tile set specified as MCTS. FIG. 23A illustrates a format of the MCTS slice index box 2201, and FIG. 23B illustrates an example of a content of the MCTS slice index box 2201. That is, FIG. 23A illustrates an internal format of the MCTS slice index box 2201 according to the present embodiment. At the beginning of the MCTS slice index box 2201, 4-byte data is stored to indicate the total data length, in bytes, of the MCTS slice index box 2201. In the MCTS slice index box 2201 according to the present embodiment, the total data length of the box is given by 4 bytes+4 bytes+2 bytes+the number of entries×2 bytes. Following the box size, a 4-byte identifier is inserted to indicate a box type. In the present embodiment, a character string "mtsi" (Motion constrained Tile set Slice Index) is used as the identifier indicating the type of the MCTS slice index box 2201.

Following the box type, 4-byte data is stored to indicate a tile set ID associated with the MCTS slice index box 2201. As described above, in an SEI message stored in a HEVC coded stream, each picture is allowed to include a plurality of tile sets, and each tile set is assigned a tile set ID. Using the tile set ID described in the MCTS slice index box 2201, it is possible to identify a tile set for which a slice index is to be specified.

Following the tile set ID, 2-byte data is inserted to indicate the number of entries, that is, the number of data bodies. In the MCTS slice index box 2201 according to the present embodiment, the number of entries is equal to the number of slices necessary to decode the specified tile set.

Following the number of entries, 2-byte slice indexes of respective tiles which are necessary to decode the specified tile set are inserted as data bodies of the MCTS slice index box 2201, such that as many 2-byte slice indexes are inserted as there are entries.

FIG. 23B illustrates an example of a content of an MCTS slice index box 2201 corresponding to a tile set with a tile set ID of 8 in FIG. 21. In FIG. 21, each tile set includes two slices, and thus the number of entries is 2, and the data size is given by 4+4+4+2+2×2=18 bytes.

Following the number of entries, slice indexes of slices necessary to decode the tile set are inserted. As illustrated in FIG. 21, to decode the tile set with the tile set ID of 8, two slices, that is, the slice #3 and the slice #4 are necessary, and thus 2 and 3 are stored as slice indexes.

In the present embodiment, the MCTS slice index box 2201 is basically stored in the sample table box 102. However, the box in which the MCTS slice index box 2201 is stored is not limited to the sample table box 102. That is, the MCTS slice index box 2201 may be stored in any box in the movie box 101.

A media file may be generated in a similar manner to that according to the first embodiment described above with reference to FIG. 4 and FIG. 5 except that the MCTS slice index box 2201 is used instead of the slice index box 105 according to the first embodiment.

However, in step S402 illustrated in FIG. 4, coding of a coding tree belonging to MCTS is performed without using a motion vector that refers to a tile outside MCTS on a reference frame.

In generating a slice header of each slice in step S408, when a slice includes an MCTS tile, a slice index is generated. In step S501 in FIG. 5, it is necessary to set which tile is in MCTS in a video sequence. Furthermore, in the setting associated with the division into tiles in step S502, the setting is performed so as to satisfy conditions associated with MCTS described in NPL 4. That is, each picture is divided into tiles in the same manner for all pictures in the sequence, and an MCTS SEI message is generated and stored as NAL unit data in sample data at the first picture.

When the process in step S507 is performed for the first picture, an MCTS slice index box 2201 is generated not based on the slice index box 105 but based on the slice index generated in step S408. The MCTS slice index box 2201 generated in step S510 is stored thereby generating a sample table box 102.

In the example described above, each picture has two MCTS tile sets, and each MCTS tile set has one rectangular tile group. However, the embodiment is not limited to this example. That is, the number of MCTS tile sets and the number of rectangular tile groups in each tile set may be set to arbitrary values as long as no conflict with the number of tiles in the picture occurs.

Furthermore, the number of MCTS slice index boxes stored does not need to be equal to the number of tile sets as in the above-described example. When there is Y MCTS tile sets in a picture, it is allowed to store Y or less MCTS slice index box 2201 in the sample table box 102. However, tile set IDs in each MCTS slice index box 2201 have values different from each other.

In the above description, it is assumed by way of example, but not limitation, that coding is performed such that each picture is divided into slices in the same manner. In a case where the manner of dividing pictures into slices are not the same for all pictures, a new MCTS slice index box 2201 is generated each time a change occurs in the division into slices, and the generated MCTS slice index box 2201 is stored in the sample table box 102.

Figure 24:
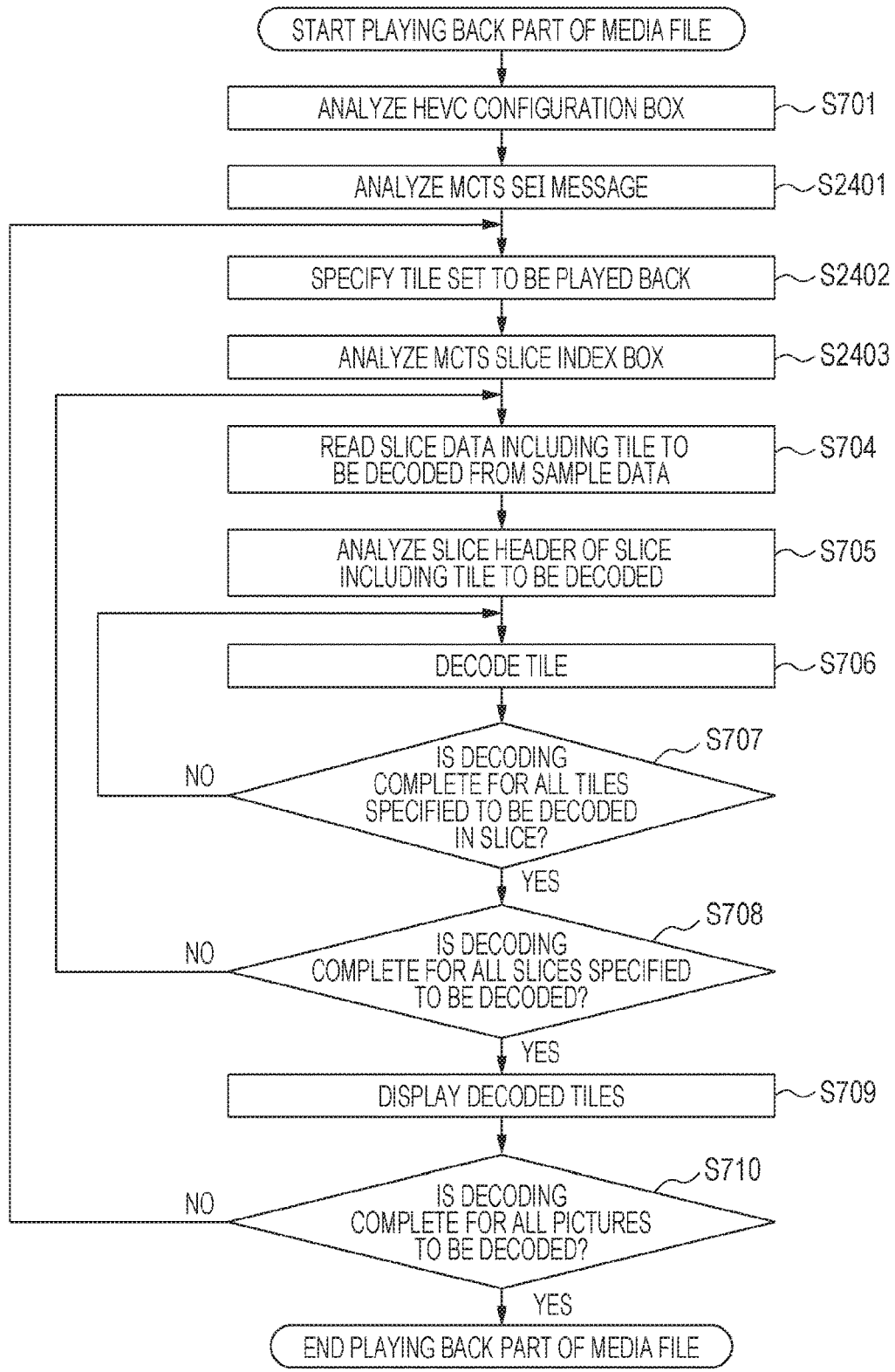
FIG. 24 is a flow chart illustrating a process of extracting only a particular tile from a media file and playing back the extracted tile according to an embodiment.

Referring to a flow chart illustrated in FIG. 24, a description is given below as to a procedure of extracting particular MCTS tile sets from a media file generated based on the media file format according to the present embodiment and decoding the extracted MCTS tile sets thereby playing back a part of the media file. In FIG. 24, it is assumed that a tile set with a tile set ID=8 in FIG. 21 is set to be decoded. In FIG. 24, steps similar to those in FIG. 7 are denoted by similar reference symbols, and a further description thereof is omitted.

In step S2401, an MCTS SEI message included in SEI data 2203 in a first sample such as that illustrated in FIG. 22 is analyzed to detect a tile set ID of each tile set specified as MCTS, and a rectangular tile group to be decoded is calculated.

In step S2402, a tile set ID of a tile set to be decoded is selected from tile sets included in the MCTS SEI message analyzed in step S2401.

In step S2403, an MCTS slice index box 2201 having the same tile set ID as the tile set ID specified in step S2402 is selected, and the selected MCTS slice index box 2201 is analyzed to identify coded slice data to be decoded. Based on information associated with a tile group to be decoded obtained from the identified coded slice data and the MCTS SEI message, the process in step S704 and following steps is performed in a similar manner to that according to the first embodiment thereby decoding tiles specified to be decoded.

As described above, also in the case where the MCTS slice index box 2201 is used, advantageous effects similar to those provided in the first embodiment are achieved. In particular, it is possible to quickly decode only tile sets specified to be decoded from a sequence based on constrained conditions associated with MCTS without referring to any tile other than the specified tile sets, which allows a further increase in speed of the decoding process.

Note that also in the present embodiment, the data length and the content of each piece of data in the MCTS slice index box 2201, the slice dividing mode, and the tile dividing mode, the character string used as the name or the identifier of the MCTS slice index box 2201, the insertion locations in the media file, and other parameters are not limited to the examples described above. Furthermore, the technique disclosed in the present embodiment may also be applied to a media file in which a still image is stored.

Seventh Embodiment

In a seventh embodiment described below, a picture group is coded using an MCTS SEI message as in the sixth embodiment and the coding is performed such that one tile includes a plurality of slices. The media file format used in the seventh embodiment may be similar to that according to the sixth embodiment described above with reference to FIG. 22.

Figure 25:
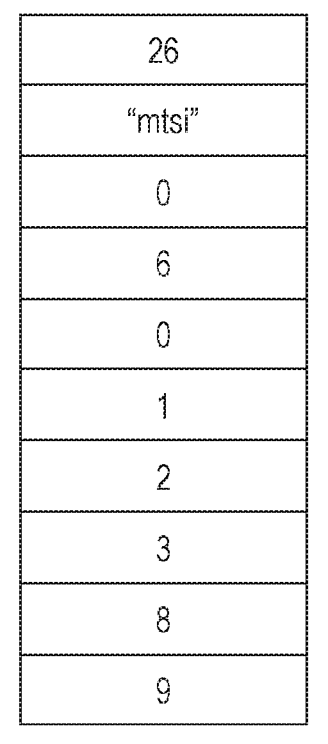

In the present embodiment, a rectangular tile group including two tiles #1 and #3 illustrated in FIG. 13 is coded as an MCTS tile set with a tile set ID of 0. FIG. 25 illustrates an MCTS slice index box indicating coded slice data necessary in decoding the MCTS tile set.

As illustrated in FIG. 13, the tile #1 includes four pieces of coded slice data, and the tile #3 includes two pieces of coded slice data, and thus the tile set to be decoded includes six pieces of coded slice data. Thus, 6 is described as the number of entries in the MCTS slice index box in FIG. 25, and slice indexes 0, 1, 2, 3, 8, and 9 are described as data body to indicate tiles #1, #2, #3, #4, #9, and #10. Furthermore, a data size stored at the beginning of the MCTS slice index box 2201 is 4+4+4+2+2×6=26 bytes.

Also in the case where a particular MCTS tile set is extracted and decoded thereby playing back a particular part of a media file, performing a process in a similar manner as in the sixth embodiment described above makes it possible to quickly decode only the specified tile set. Thus, also in the case where each picture in a video sequence is divided into tiles and slices such that one tile include a plurality of slices as in the present embodiment, advantageous effects similar to those provided in the sixth embodiment are achieved.

Note that also in the present embodiment, as in the sixth embodiment, the data length and the content of each piece of data in the MCTS slice index box 2201, the mode of dividing each picture into slices and tiles, the character string used as the name or the identifier of the MCTS slice index box 2201, the insertion locations in the media file, and other parameters are not limited to the examples described above. Furthermore, the technique disclosed in the present embodiment may also be applied to a media file in which a still image is stored.

Eighth Embodiment

In an eighth embodiment described below, a tile set specified as MCTS used in the sixth embodiment and the seventh embodiment is explicitly specified as a region of interest (ROI) with priority.

Figure 26:
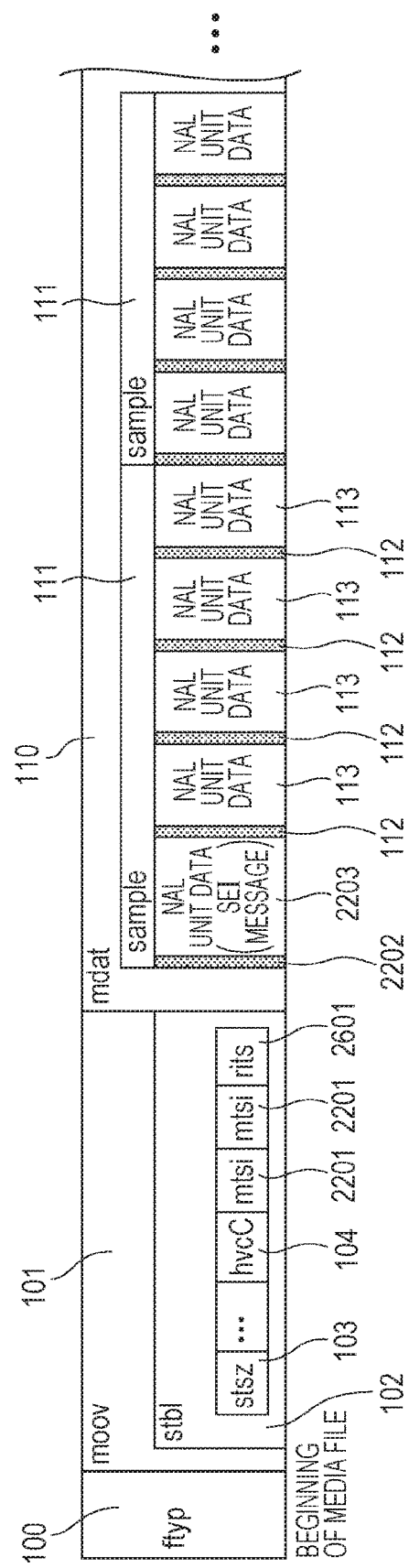
FIG. 26 is a diagram illustrating a media file format according to an embodiment.

FIG. 26 illustrates a media file format according to the eighth embodiment. In FIG. 26, similar boxes and data to those illustrated in FIG. 22 are denoted by similar reference symbols, and a further description thereof is omitted.

In the present embodiment, as illustrated in FIG. 26, following the MCTS slice index box 2201, a ROI tile set box 2601 is stored in the sample table box 102. Note that in the example of the media file illustrated in FIG. 26, it is assumed, as in the sixth embodiment, that coding is performed such that each picture includes two MCTS tile sets as illustrated in FIG. 21.

In the present embodiment, as illustrated in FIG. 26, the media file includes a ROI tile set box 2601 indicating MCTS tile sets specified as a ROI with priority. FIG. 27A illustrates a format of the ROI tile set box 2601, and FIG. 27B illustrates an example of a content of the ROI tile set box 2601.

FIG. 27A illustrates an example of an internal format of the ROI tile set box 2601 according to the present embodiment. At the beginning of the ROI tile set box 2601, 4-byte box size data is stored to indicate the total data length, in bytes, of the ROI tile set box 2601. In the present example, the total data length of the ROI tile set box 2601 is given by 4 bytes+4 bytes+2 bytes+the number of entries×5 bytes.

Following the box size, a 4-byte identifier is inserted to indicate a box type. In the present embodiment, a character string "rits" (Region of Interest Tile Set) is used as the identifier to identify the type of the ROI tile set box 2601.

Following the box type, 2-byte data is inserted to indicate the number of entries, that is, the number of data bodies. In the ROI tile set box 2601 according to the present embodiment, the number of entries is equal to the number of tile sets included in the specified ROI. Following the number of entries, 4-byte data representing a tile set ID of a tile set specified as being included in a ROI and 1-byte data representing ROI priority of this tile set (and thus a total of 5 bytes) are inserted as data body of the ROI tile set box 2601. Note that as many pieces of these data are inserted as there are entries. As for the ROI priority, a value is selected from a range from 0 to 255 to indicate the priority of displaying the tile set as the ROI. Note that the higher the value, the higher the priority.

FIG. 27B illustrates an example of a content of the ROI tile set box 2501 for a case where the tile set with the tile set ID=0 on the upper right of FIG. 21 is specified as a low-priority ROI, and the tile set with the tile set ID=8 on the bottom of FIG. 21 is specified as a high-priority ROI. There are two tile sets specified as ROIs, and thus the number of entries is 2, and the data size is given by 4+4+2+2×5=20 bytes.

Following the number of entries, a value of 0 is described to indicate that the tile set ID is 0 and furthermore a value of 0 is described to indicate that the ROI priority of this tile set is 0, that is, this tile set is specified as a low-priority region of interest. Subsequently, a value 8 is described to indicate that the tile set ID is 8 and furthermore a value of 255 is described to indicate that the ROI priority of this tile set is 255, that is, this tile set is specified as a high-priority region of interest.

The ROI tile set box 2601 is basically stored in the sample table box 102. Note that the ROI tile set box 2601 may be stored in another box. That is, the ROI tile set box 2601 may be stored in any box in the movie box 101.

A media file may be generated in a similar manner to the sixth embodiment described above with reference to FIG. 4 and FIG. 5. However, in step S501 in FIG. 5, setting is performed as to which tile is specified as being included in MCTS in a video sequence and which tile set in the MCTS is specified as being included in a ROI, and furthermore setting is performed to specify the priority for each ROI. The setting as to the specifying of the ROI and the priority thereof may be performed based on information generally obtainable when a picture is taken using a camera as to a face or a figure of a person, an object, or the like recognized from the picture, or based on person identification information of a particular person.

Furthermore, in step S507 in FIG. 5, the ROI tile set box 2601 is generated in addition to the MCTS slice index box 2201. In the process of generating the sample table box in step S510, the ROI tile set box 2601 is stored together with the MCTS slice index box 2201.

Also in the case where a particular MCTS tile set is extracted and decoded thereby playing back a particular part of a media file, performing a process in a similar manner as in the sixth embodiment described above with reference to FIG. 24 makes it possible to quickly decode only the specified tile set as a partial motion picture.

However, in step S2402, the priority of the ROI to be played back is specified by a user. Based on the specified ROI priority, the ROI tile set box 2601 is referred to, and the tile set ID of the MCTS tile set to be played back is calculated. An MCTS slice index box 2201 with the calculated tile set ID is searched for, and, based on the retrieved MCTS slice index box 2201, it is possible to identify coded slice data necessary to decode the tile set to be decoded.

In the present embodiment, the capability of specifying a particular MCTS tile set as a ROI with priority provides an advantageous effect that a tile set to be decoded may be determined depending on the ROI priority specified by a user, in addition to advantageous effects similar to those provided by the sixth embodiment.

Note that also in the present embodiment, the data length and the content of each piece of data in the ROI tile set box 2601, the mode of dividing each picture into slices and tiles, the character string used as the name or the identifier of the ROI tile set box 2601, the insertion locations in the media file, and other parameters are not limited to the examples described above. Furthermore, the technique disclosed in the present embodiment may also be applied to a media file in which a still image is stored.

Ninth Embodiment

In a ninth embodiment described below, specifying a region of interest (ROI) and priority thereof used in the eighth embodiment is applied to a case where each picture includes only normal tiles which are not of MCTS.

Figure 28:
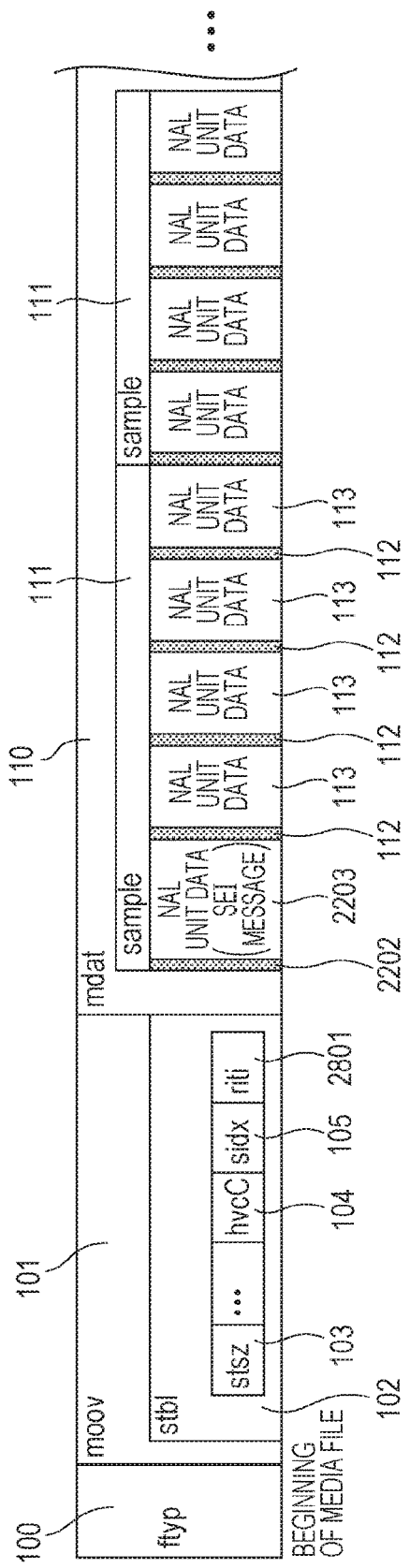
FIG. 28 is a diagram illustrating a media file format according to an embodiment.

FIG. 28 illustrates a media file format according to the present embodiment. In FIG. 24, similar boxes and data to those illustrated in FIG. 22 are denoted by similar reference symbols, and a further description thereof is omitted.

In the present embodiment, as illustrated in FIG. 28, a ROI tile index box 2801 is stored together with the slice index box 105 in the sample table box 102. Note that FIG. 28 illustrates a particular example in which there is only one region specified as a ROI. In a case where there are N regions specified as ROIs, N ROI tile index boxes 2801 are stored in the sample table box 102.

FIG. 29A illustrates an internal format of the ROI tile index box 2801 according to the present embodiment. At the beginning of the ROI tile index box 2801, 4-byte box size data is stored to indicate the total data length, in bytes, of the ROI tile index box 2801. In the ROI tile index box 2801 according to the present embodiment, the total data length of the box is given by 4 bytes+4 bytes+4 bytes+1 bytes+2 bytes+the number of entries×2 bytes.

Following the box size, a 4-byte identifier is inserted to indicate a box type. In the present embodiment, a character string "riti" (Region of Interest Tile Index) is used as the identifier indicating the type of the ROI tile index box 2801.

Following the box type, a 4-byte ROI ID is inserted to identify a specified region of interest. As with the tile set ID according to the sixth embodiment, the ROI ID may have a value arbitrarily selected from a range from 0 to 255. However, in a case where a plurality of ROIs are defined in a picture, and a plurality of ROI tile index boxes 2801 are stored in the sample table box 102, the ROI IDs in the respective ROI tile index boxes 2801 are set to have different values.

Following the ROI ID, 1-byte ROI priority is inserted to indicate the priority of the specified region. As in the eighth embodiment, the value of the ROI priority is selected from a range from 0 to 255 such that the higher the value, the higher the priority.

Following the ROI priority, 2-byte data is inserted to indicate the number of entries, that is, the number of data bodies. In the ROI tile index box 2801 according to the present embodiment, the number of entries is equal to the number of tiles included in the ROI. Following the number of entries, as many 2-byte tile indexes as there are entries are inserted as data bodies of the ROI tile index boxes 2801 to indicate respective tiles of the ROI. The tile index is defined in the same manner as in the second embodiment, and thus a further description thereof is omitted.

FIG. 29B illustrates an example of a content of the ROI tile set box 2801 for a case where when a picture is divided into slices and tiles in the manner described in FIG. 2, four tiles #6, #7, #10, and #11 are specified as being included in a high-priority ROI with a ROI ID of 1.

There are 4 tiles in the ROI, and thus the number of entries is 4 and the data size is given by 4+4+4+1+2×4=23 bytes. Following the box type, a value of 1 is described to indicate that ROI ID=1, and furthermore a value of 255 is described to indicate that the priority of this ROI is as high as 255.

Following the ROI priority, a value of 4 is inserted as the number of entries, and furthermore, tile indexes 5, 6, 9, and 10 are inserted as data bodies of the ROI tile index box 2801 to respectively indicate tiles #6, #7, #10, and #11 included in the ROI.

The ROI tile index box 2801 is basically stored in the sample table box 102. However, the ROI tile index box 2801 may be stored in another box. That is, the ROI tile index box 2801 may be stored in any box in the movie box 101.

A media file may be generated in a similar manner as in the first embodiment described above with reference to FIG. 4 and FIG. 5. However, in step S502 in FIG. 5, setting is performed as to which tile set in the picture is specified as being included in a ROI, and furthermore setting is performed to specify the priority for each ROI. The setting as to the specifying of the ROI and the priority thereof may be performed based on information generally obtainable when a picture is taken using a camera as to a face or a figure of a person, an object, or the like recognized from the picture, or based on person identification information of a particular person.

Furthermore, in step S507 in FIG. 5, the ROI tile index box 2801 is generated in addition to the slice index box 105. In the process of generating the sample table box in step S510, the ROI tile index box 2801 is stored together with the slice index box 105.

Also in the case where a media file is partially played back while extracting only particular ROI tiles, performing a process in a similar manner as in the first embodiment described above with reference to FIG. 7 makes it possible to quickly decode only the ROI. In step S702, the priority of the ROI to be played back is specified, for example, by a user. Based on the specified ROI priority, in step S702, the ROI tile index box 2801 with the specified priority is referred to, and the tile index of the ROI to be played back is calculated.

In step S703, coded slice data necessary to decode the tiles included in the ROI calculated in step S702 is identified based on the slice index box 105. In step S704 and following steps, the identified coded slice data is decoded thereby decoding the ROI.

In the present embodiment, also in the case where MCTS is not used, the capability of specifying tiles forming a ROI by IDs and tile indexes with priority makes it possible to achieve advantageous effects similar to those provided in the eighth embodiment. However, because MCTS is not used, there is a possibility that, in decoding, it becomes necessary to refer to a tile other than ROI tiles. This may cause the decoding speed to be lower than that achieved by the eighth embodiment using the MCTS.

Note that also in the present embodiment, the data length and the content of each data in the ROI tile index box 2801, the mode of dividing each picture into slices and tiles, the character string used as the name or the identifier of the ROI tile index box 2801, the insertion locations in the media file, and other parameters are not limited to the examples described above. Furthermore, the technique disclosed in the present embodiment may also be applied to a media file in which a still image is stored. The technique disclosed in the present embodiment may also be applied to a case where one or both of the ROI ID and the ROI priority are not used.

The method of specifying a tile group as a region of interest is not limited to directly specifying a tile group by tile indexes as with the method described above. For example, a rectangular region may be specified as a region of interest by specifying an index of a tile on the upper left of the rectangular region and an index of a tile on the lower right of the rectangular region.

In a case where either a ROI ID or ROI priority does not exist, a user may determine a ROI by using available one of the ROI ID or the ROI priority in playing back a media file.

In the present embodiment, instead of the slice index box 105, the tile index box 801 according to the second embodiment may be used as data in the media file. In this case, it is possible to identify a slice necessary to decode a ROI, by comparing the tile index box 801 with the tile index of the ROI to be decoded.

Furthermore, the present embodiment may be applied to a case where there is no slice index box 105 as data in the media file. However, in this case, a slice header is analyzed for all pieces of coded slice data in a picture, and, based on the location-in-picture of each slice and the tile division information, a determination is performed as to whether the slice is necessary in decoding a ROI.

The analysis of the slice headers of all pieces of coded slice data results in an increase in decoding time compared with the case where the slice index box 105 exists. However, even in this case, the decoding time is greatly reduced compared with the case where the whole picture area is first decoded and then a ROI part is extracted.

Furthermore, the present embodiment may also be applied to a case where each picture is not divided into a plurality of slices, but coding is performed such that the picture include a single slice. In this case, by referring to the ROI tile index box 2801 and the entry point offset of each tile included in the slice header described above in the first embodiment, it is possible to quickly access coded data of tiles necessary to decode the ROI and thus it is possible to quickly decode the ROI.

Tenth Embodiment

In a tenth embodiment described below, a determination is performed as to whether the MCTS or the ROI tile described in the sixth to ninth embodiments is valid at each point of a time sequence.

Figure 30:
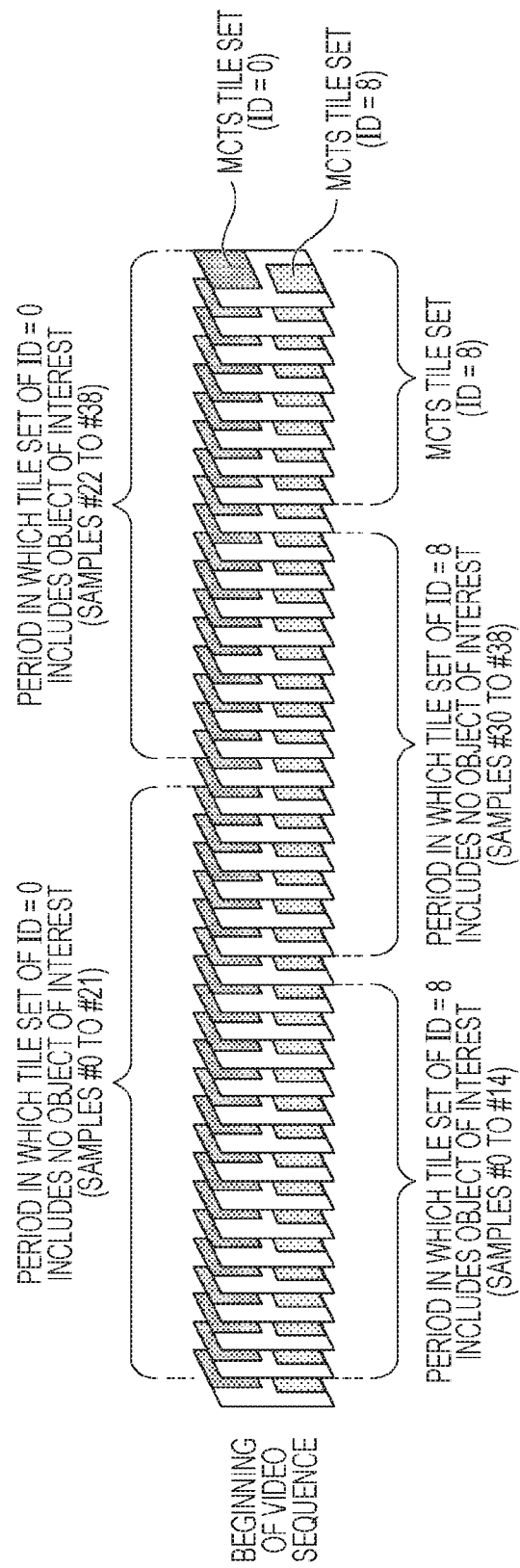
FIG. 30 is a diagram illustrating valid samples in each tile set according to an embodiment.

FIG. 30 illustrates an example in which a motion of a subject or a motion of a motion picture tacking apparatus causes an object of interest such as a figure of a person or the like to temporarily go out of a region of interest of a picture. In FIG. 30, it is assumed by way of example that coding is performed such that two MCTS tile sets with tile set IDs of 0 and 8, respectively, are specified as region of interests.

In the tile set with the tile set ID of 0, as illustrated in FIG. 30, the object of interest is not included in this tile set over a period from a sample #0 at the top of a sequence to a sample #21. On the other hand, in the tile set with the tile set ID of 8, the object of interest is included in this tile set in a period from the sample #0 at the top of the sequence to a sample #14 and in a period from a sample #30 to a sample #38, but the object of interest is not included in this tile set in the other periods.

Figure 31:
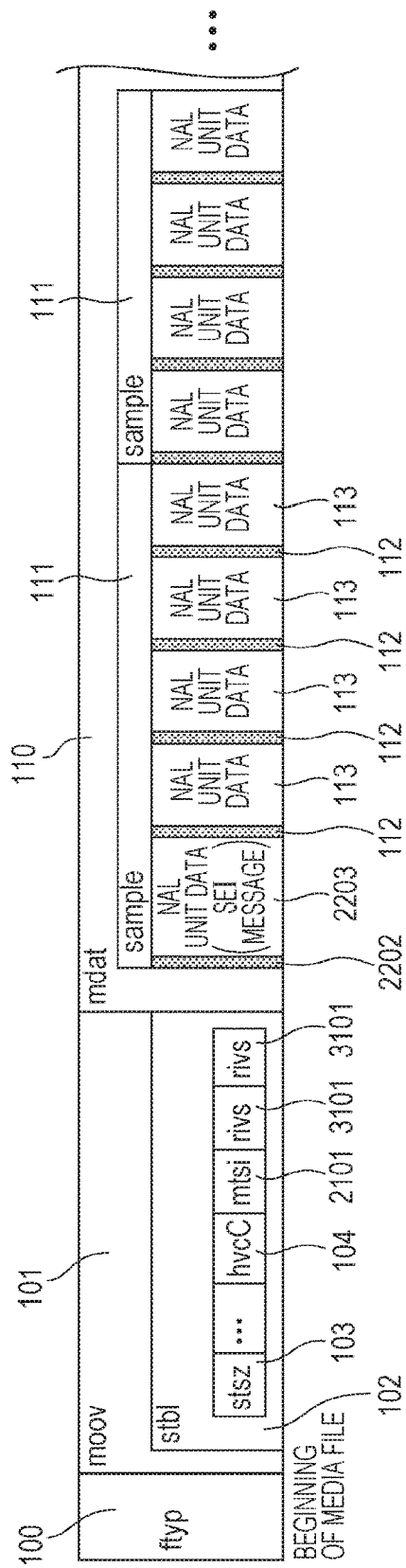
FIG. 31 is a diagram illustrating a media file format according to an embodiment.

FIG. 31 illustrates a media file format according to the present embodiment. In FIG. 31, similar boxes and data to those illustrated in FIG. 22 are denoted by similar reference symbols, and a further description thereof is omitted. In the present embodiment, as illustrated in FIG. 31, the ROI valid sample box 3101 is stored together with the MCTS slice index box 2201 in the sample table box 102.

In the example illustrated in FIG. 31, it is assumed that there are two tile sets for which valid samples are to be specified. In a case where there are M tile sets or M ROI tiles for which valid samples are to be specified, M ROI valid sample boxes 3101 are stored in the sample table box 102.

In the present embodiment, regarding the MCTS tile set or the ROI tile, each ROI valid sample box 3101 illustrated in FIG. 31 includes information indicating which sample in a time sequence is a valid sample in which an object of interest exists in the tile set. FIG. 32A illustrates a format of the ROI valid sample box 3101, and FIGS. 32B and 32C illustrates examples of contents of ROI valid sample box 3101.

FIG. 32A illustrates an internal format of the ROI valid sample box 3101 according to the present embodiment. At the beginning of the ROI valid sample box 3101, 4-byte box size data is stored to indicate the total data length, in bytes, of the ROI valid sample box 3101. In the ROI valid sample box 3101 according to the present embodiment, the total data length of the box is given by 4 bytes+4 bytes+4 bytes+2 bytes+the number of entries×8 bytes.

Following the box size, a 4-byte identifier is inserted to indicate a box type. In the present embodiment, a character string "rivs" (Region of Interest Valid Samples) is used as the identifier indicating the type of the ROI valid sample box 3101.

Following the box type, 4-byte data is stored to represent a tile set ID identifying a tile set for which valid samples are to be specified. In the ROI valid sample box 3101, information is described to indicate whether an object of interest is included in a tile set with the tile set ID described herein. Note that the information in the ROI valid sample box 3101 is given only for the tile set with this tile set ID.

Following the tile set ID, 2-byte data is inserted to indicate the number of entries, that is, the number of data bodies. In the ROI valid sample box 3101 according to the present embodiment, the number of entries is equal to the number of times that a period including successive samples that are all valid occurs in the tile set of interest.

Following the number of entries, 4-byte data indicating a start sample of valid samples and 4-byte data indicating the number of successive valid samples in a period, that is, a total of 8-byte data is inserted as data bodies of the ROI valid sample box 3101. Note that as many pieces of such data are inserted as there are entries.

FIG. 32B illustrates an example of a content of a ROI valid sample box 3101 associated with valid samples corresponding to the tile set with the tile set ID of 0 in FIG. 30. FIG. 32C illustrates an example of a content of a ROI valid sample box 3101 associated with valid samples corresponding to the tile set with the tile set ID of 8 in FIG. 30.

As illustrated in FIG. 32B, in the tile set with the tile set ID of 0 illustrated in FIG. 30, there is one period including successive samples that are all valid. Thus, the data size is 4+4+4+2+1×8=22 bytes, the tile set ID is 0, and the number of entries is 1. Following the number of entries, a value of 22 indicating a sample #22 as the start sample of the valid period and a value of 16 indicating the number of successive valid samples are inserted as data bodies of the ROI valid sample box 3101.

Similarly, as illustrated in FIG. 32C, in the tile set with the tile set ID of 8, there are two periods during each of which all successive samples are valid. Thus, the data size is inserted as 4+4+4+2+2×8=30 bytes. A value of 0 is then inserted to indicate a sample #0 as the start sample of the first valid period. Subsequently, a value of 14 is inserted to indicate the number of successive valid samples. A value of 30 is then inserted to indicate a sample #30 as the start sample of the second valid period. Subsequently, a value of 8 is inserted to indicate the number of successive valid samples.

A media file may be generated in a similar manner to the sixth embodiment described above with reference to FIG. 4 and FIG. 5. However, in step S507 in FIG. 5, a determination as to whether each tile set includes validation information is performed based on a recognition result, an authentication result, or the like, and the MCTS slice index box 2201 is generated depending on a result of the determination. In step S510, the ROI valid sample box 3101 is generated based on the validation information and stored together with the MCTS slice index box 2201 in the sample table box 102.

Thus, also in the case where a particular MCTS tile set is extracted and decoded thereby playing back a particular part of a media file, performing a process in a similar manner as in the sixth embodiment described above with reference to FIG. 24 makes it possible to quickly decode only the specified tile set. However, in step S2402, the ROI valid sample box 3101 with the tile set ID corresponding to a tile set to be decoded is analyzed to determine whether each sample corresponding to a picture, in the tile set to be decoded, is valid or not. In a case where a sample under analysis is not valid, the decoding and the displaying of the invalid picture is skipped until a picture including a valid sample is reached. When the valid sample is reached, the decoding is started. Thus, for a tile set defining a region of interest, it is possible to decode only pictures including an object of interest and thus it is possible to perform the decoding process in an efficient manner.

For example, in a case where a tile set with a tile set ID of 8 in FIG. 30 is specified by a user to be decoded, if the ROI valid sample box 3101 is not used, it is necessary to decode the specified tile set over all 39 pictures. In contrast, when the ROI valid sample box 3101 is available, the ROI valid sample information included in the ROI valid sample box 3101 is referred to, and it is allowed to decode the tile set for only pictures in which an object of interest is included in the tile set. In this case, the tile set is decoded for only 15+9=24 pictures.

Note that also in the present embodiment, the data length and the content of each data in the ROI valid sample box 3101, the mode of dividing each picture into slices and tiles, the character string used as the name or the identifier of the ROI valid sample box 3101, the insertion locations in the media file, and other parameters are not limited to the examples described above.

In the present embodiment, the ROI valid sample box 3101 may specify whether an object of interest is included in a region of interest for an MCTS tile set specified as a ROI according to the eighth embodiment, or for a ROI tile using no MCTS according to the ninth embodiment. To specify a valid sample period of a ROI tile according to the ninth embodiment, a ROI ID described above with reference to FIGS. 29A and 29B may be used instead of a tile set ID in FIGS. 32A to 32C to indicate which sample in which ROI is valid.

In the present embodiment, a period in which a tile set is valid is specified in units of samples corresponding to pictures. However, the present embodiment is not limited to this scheme. For example, it may be allowed to specify a period in which a tile set is valid, by specifying a display time of a picture (start time of a valid period) and a valid duration. Alternatively, it may be allowed to specify a period in which a tile set is valid by specifying a start sample and an end sample. Still alternatively, it may be allowed to specify a period in which a tile set is valid by specifying a start display time and an end display time.

In the present embodiment, it is assumed that a media file includes one video sequence. However, the present embodiment is not limited to this. That is, a media file may include a plurality of video sequences. It may be allowed to provide information indicating whether or not each region of interest includes an object of interest in units of video sequences. In this case, a sequence ID serving as an identifier of a video sequence may be stored as a valid sequence ID instead of the set of the valid start sample and the number of successive valid samples in the ROI valid sample box 3101 described above with reference to FIGS. 32A to 32C.

For example, in a case where a media file includes four video sequences with sequence IDs 0 to 3, when an object of interest is included only in the video sequences with the sequence IDs of 1 and 3, then values of 1 and 3 indicating valid sequence IDs are stored as data bodies in the ROI valid sample box 3101.

In the case where a valid sequence ID is used instead of valid samples to indicate whether each region of interest includes an object of interest, it is possible to achieve advantageous effects similar to those achieved by use of the valid samples.

Other Embodiments

Figure 20:
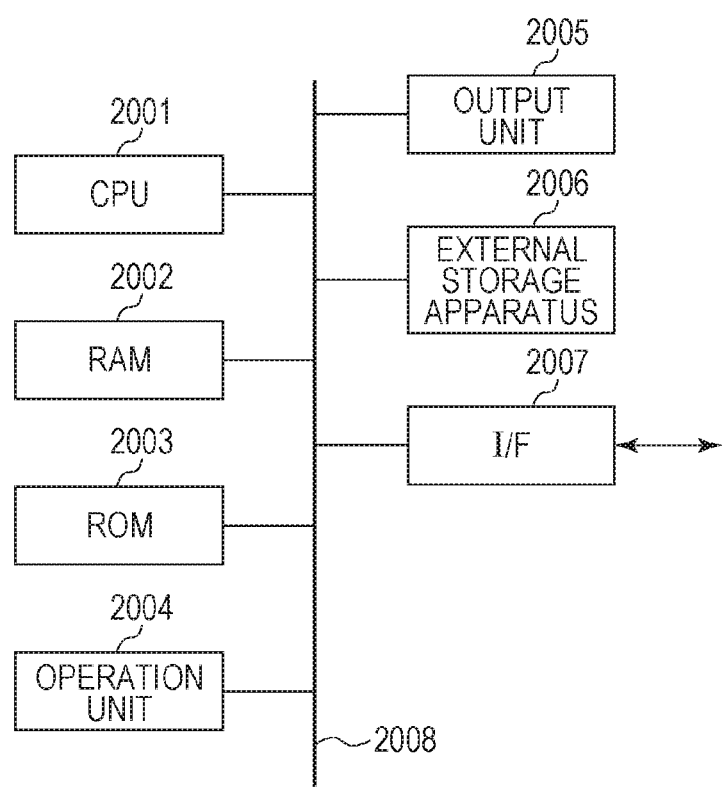
FIG. 20 is a diagram illustrating an example of a hardware configuration of a computer usable to practice a media file generation method according to embodiment.

FIG. 20 is a block diagram illustrating an example of a hardware configuration of a computer that executes a program to perform the processes according to any embodiment described above.

A CPU 2001 controls a whole computer using a computer program and associated data stored in a RAM 2002 or ROM 2003, and furthermore, the CPU 2001 executes the process according to one of the embodiments described above.

The RAM 2002 includes a memory area in which a computer program and associated data loaded from an external storage device 2006, data input from the outside via an interface (I/F) 2007, and the like are temporarily stored. The RAM 2002 also includes a work area used by the CPU 2001 to execute various processes. The RAM 2002 may be allocated as a frame memory or the like, and the RAM 2002 may provide various memory areas as required.

In the ROM 2003, setting data of the computer, a boot program, and the like are stored. An operation unit 2004 includes a keyboard, a mouse, and the like, and is operated by a user of the computer to input various commands into the CPU 2001. An output unit 2005 outputs a result of the process performed by the CPU 2001. The output unit 2005 may be, for example, a display such as a liquid crystal display, and the result of the process may be displayed thereon.

The external storage device 2006 may be a high-storage information storage device typified by a hard disk drive. In the external storage device 2006, an operating system (OS) and computer programs are stored to make it possible for the CPU 2001 to execute the process according to one of the embodiments described above. The external storage device 2006 may also be used to store images to be processed.

The computer programs and data stored in the external storage device 2006 are loaded, under the control of the CPU 2001, into the RAM 2002 as required, and executed by the CPU 2001. The I/F 2007 may be connected to a network such as a LAN, the Internet, or the like and another apparatuses such as a projection apparatus, a display apparatus, or the like thereby making it possible for the computer to input or output various kinds of information via the I/F 2007. The units described above are connected to each other via a bus 2008.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for playing back one or more partial videos from among a plurality of partial videos corresponding to a plurality of spatial sub regions that are spatially contiguous to one another, the method comprising:
   obtaining meta information relating to the plurality of partial videos,
   wherein the meta information includes all of (i) spatial size information which represents, by a number of pixels, both of a width and a height individually for each of the plurality of spatial sub regions, (ii) a Sequence Parameter Set (SPS) for each of the plurality of partial videos, each of the plurality of partial videos encoded according to a predetermined encoding scheme, and pieces of encoded video data obtained by the encoding of the plurality of partial videos according to the predetermined encoding scheme each included in one or more Network Abstraction Layer Units (NALUs), and (iii) spatial position information which represents a spatial position of a spatial sub region, for each of the plurality of spatial sub regions that are spatially contiguous to one another;
   determining, based on operation information according to a user operation which is input after the obtaining the meta information and which is regarding designation of a Region Of Interest (ROI), ROI information for identifying one or more partial videos to be played back from among the plurality of partial videos; and
   playing back, based on encoded video data included in obtained one or more NALUs, the one or more partial videos, identified according to the ROI information, from among the plurality of partial videos.

2. The method according to claim 1, wherein the meta information further includes type information representing a type of an encoding scheme used in encoding the video data, for each of the plurality of partial videos.

3. The method according to claim 2, wherein the type information represents the type of the encoding scheme by a four-character code.

4. The method according to claim 3, wherein the one or more partial videos identified according to the ROI information are played back by decoding the encoded video data based on the predetermined encoding scheme represented by the type information.

5. The method according to claim 1, wherein the one or more partial videos identified according to the ROI information are played back by decoding the encoded video data based on parameters indicated by the SPS included in the meta information.

6. The method according to claim 1, wherein the meta information further includes parameters belonging to a Picture Parameter Set (PPS), and wherein the one or more partial videos identified according to the ROI information are played back by decoding the encoded video data based on the parameters belonging to the PPS.

7. The method according to claim 1, wherein a width of at least one spatial region among the plurality of spatial regions is different from a width of another spatial region among the plurality of spatial regions.

8. The method according to claim 1, wherein a height of at least one spatial region among the plurality of spatial regions is different from a height of another spatial region among the plurality of spatial regions.

9. The method according to claim 1, wherein the meta information is obtained earlier than the one or more NALUs are obtained, the one or more NALUs including the encoded video data of the one or more partial videos identified according to the ROI information.

10. The method according to claim 1, wherein all of the plurality of spatial regions are rectangular regions, and a value of the width and a value of the height represented by the spatial size information are different from each other.

11. An apparatus for playing back one or more partial videos from among a plurality of partial videos corresponding to a plurality of spatial sub regions that are spatially contiguous to one another, the apparatus comprising:
   at least one hardware processor; and
   at least one memory storing one or more programs that, when executed by the at least one hardware processor, cause the apparatus to perform operations comprising:
   obtaining meta information relating to the plurality of partial videos,
   wherein the meta information includes all of (i) spatial size information which represents, by a number of pixels, both of a width and a height individually for each of the plurality of spatial sub regions, (ii) a Sequence Parameter Set (SPS) for each of the plurality of partial videos, each of the plurality of partial videos encoded according to a predetermined encoding scheme, and pieces of encoded video data obtained by the encoding of the plurality of partial videos according to the predetermined encoding scheme each included in one or more Network Abstraction Layer Units (NALUs), and (iii) spatial position information which represents a spatial position of a spatial sub region, for each of the plurality of spatial sub regions that are spatially contiguous to one another;
determining, based on operation information according to a user operation which is input after the obtaining the meta information and which is regarding designation of a Region Of Interest (ROI), ROI information for identifying one or more partial videos to be played back from among the plurality of partial videos; and
playing back, based on encoded video data included in obtained one or more NALUs, the one or more partial videos, identified according to the ROI information, from among the plurality of partial videos.

12. The apparatus according to claim 11, wherein the meta information further includes type information representing a type of an encoding scheme used in encoding the video data, for each of the plurality of partial videos.

13. The apparatus according to claim 12, wherein the type information represents the type of the encoding scheme by a four-character code.

14. The apparatus according to claim 13, wherein the one or more partial videos identified according to the ROI information are played back by decoding the encoded video data based on the predetermined encoding scheme represented by the type information.

15. A non-transitory computer-readable storage medium storing a program for causing a computer to execute a method for playing back one or more partial videos from among a plurality of partial videos, the plurality of partial videos corresponding to a plurality of spatial sub regions that are spatially contiguous to one another, the method comprising:
obtaining meta information relating to the plurality of partial videos,
wherein the meta information includes all of (i) spatial size information which represents, by a number of pixels, both of a width and a height individually for each of the plurality of spatial sub regions, and (ii) a Sequence Parameter Set (SPS) for each of the plurality of partial videos, each of the plurality of partial videos encoded according to a predetermined encoding scheme, and pieces of encoded video data obtained by the encoding of the plurality of partial videos according to the predetermined encoding scheme each included in one or more Network Abstraction Layer Units (NALUs), and (iii) spatial position information which represents a spatial position of a spatial sub region, for each of the plurality of spatial sub regions that are spatially contiguous to one another;
determining, based on operation information according to a user operation which is input after the obtaining the meta information and which is regarding designation of a Region Of Interest (ROI), ROI information for identifying one or more partial videos to be played back from among the plurality of partial videos; and
playing back, based on encoded video data included in obtained one or more NALUs, the one or more partial videos identified, according to the ROI information, from among the plurality of partial videos.

16. The non-transitory computer-readable storage medium according to claim 15, wherein the meta information further includes type information representing a type of an encoding scheme used in encoding the video data, for each of the plurality of partial videos.

17. The non-transitory computer-readable storage medium according to claim 16, wherein the type information represents the type of the encoding scheme by a four-character code.

18. The non-transitory computer-readable storage medium identified according to claim 17, wherein the one or more partial videos according to the ROI information are played back by decoding the encoded video data based on the predetermined encoding scheme represented by the type information.

* * * * *